US011527065B2

(12) United States Patent
Okamoto

(10) Patent No.: US 11,527,065 B2
(45) Date of Patent: Dec. 13, 2022

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Kensuke Okamoto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/398,785

(22) Filed: Aug. 10, 2021

(65) Prior Publication Data

US 2022/0230015 A1 Jul. 21, 2022

(30) Foreign Application Priority Data

Jan. 18, 2021 (JP) .............................. JP2021-005971

(51) Int. Cl.
| | | |
|---|---|---|
| *G06F 3/14* | (2006.01) | |
| *G06F 3/01* | (2006.01) | |
| *G06V 20/20* | (2022.01) | |
| *G06F 3/16* | (2006.01) | |
| *G02B 27/01* | (2006.01) | |
| *G08B 7/06* | (2006.01) | |

(52) U.S. Cl.
CPC ......... *G06V 20/20* (2022.01); *G02B 27/0172* (2013.01); *G06F 3/017* (2013.01); *G06F 3/14* (2013.01); *G06F 3/167* (2013.01); *G08B 7/06* (2013.01); *G02B 2027/014* (2013.01); *G02B 2027/0138* (2013.01); *G02B 2027/0178* (2013.01)

(58) Field of Classification Search
CPC ................ G06V 20/20; G02B 27/0172; G02B 2027/0138; G02B 2027/014; G02B 2027/0178; G02B 2027/0141; G06F 3/017; G06F 3/14; G06F 3/167; G08B 7/06
See application file for complete search history.

(56) References Cited

U.S. PATENT DOCUMENTS

| | | | | |
|---|---|---|---|---|
| 10,075,340 | B2* | 9/2018 | Okayama | ............ H04L 41/0883 |
| 10,539,787 | B2* | 1/2020 | Haddick | ............... G06F 3/0428 |
| 10,691,199 | B2* | 6/2020 | Shanware | .............. G02B 27/01 |
| 10,937,391 | B2* | 3/2021 | Griswold | ................ G06T 19/00 |
| 11,170,539 | B2* | 11/2021 | Inatani | .................... G06F 3/013 |
| 11,172,189 | B1* | 11/2021 | Elmieh | ................. G06V 20/20 |
| 11,282,285 | B1* | 3/2022 | Trim | ..................... H04W 4/029 |
| 2011/0302662 | A1* | 12/2011 | Kannari | ................. G06F 21/10 |
| | | | | 726/29 |

(Continued)

FOREIGN PATENT DOCUMENTS

| | | |
|---|---|---|
| JP | 2017-174018 A | 9/2017 |
| JP | 6424100 B2 | 11/2018 |

*Primary Examiner* — Grant Sitta
(74) *Attorney, Agent, or Firm* — Oliff PLC

(57) ABSTRACT

An information processing apparatus includes: a processor configured to: when existence of predetermined information is detected, inquire a user whether to display contents of the information before the contents of the information are displayed as an augmented-reality image in front of a user's field of view; and control the displaying of the contents of the information by the augmented-reality image according to a user's instruction in response to the inquiry.

21 Claims, 31 Drawing Sheets

(56) References Cited

U.S. PATENT DOCUMENTS

| | | | | |
|---|---|---|---|---|
| 2012/0154557 | A1* | 6/2012 | Perez | G06F 3/017 |
| | | | | 348/E13.001 |
| 2014/0098137 | A1* | 4/2014 | Fein | G06T 11/00 |
| | | | | 345/633 |
| 2014/0125574 | A1* | 5/2014 | Scavezze | G06F 21/34 |
| | | | | 345/156 |
| 2014/0285521 | A1* | 9/2014 | Kimura | G02B 27/017 |
| | | | | 345/633 |
| 2014/0300636 | A1* | 10/2014 | Miyazaya | H04R 5/033 |
| | | | | 345/633 |
| 2015/0153570 | A1* | 6/2015 | Yamamoto | H04M 1/72472 |
| | | | | 345/184 |
| 2015/0264450 | A1* | 9/2015 | Jung | H04N 21/23418 |
| | | | | 725/32 |
| 2016/0343168 | A1* | 11/2016 | Mullins | G06T 19/006 |
| 2018/0018933 | A1* | 1/2018 | Rehmeyer | G06F 3/012 |
| 2018/0059773 | A1* | 3/2018 | Park | G06F 3/04847 |
| 2019/0325224 | A1* | 10/2019 | Lee | G06V 20/20 |
| 2019/0332863 | A1* | 10/2019 | Abhishek | G06F 3/011 |
| 2020/0026922 | A1* | 1/2020 | Pekelny | G06T 19/006 |
| 2020/0272223 | A1* | 8/2020 | Joiner | G06F 3/04815 |
| 2021/0063971 | A1* | 3/2021 | Sato | A61B 5/01 |
| 2021/0289068 | A1* | 9/2021 | Hosoda | G06F 3/16 |
| 2021/0312887 | A1* | 10/2021 | Griswold | G06F 3/0346 |
| 2022/0013129 | A1* | 1/2022 | Carbune | H04L 51/02 |
| 2022/0113934 | A1* | 4/2022 | Lee | G06F 3/0481 |

* cited by examiner

| TARGET | CONTENTS | USER SETTING |
|---|---|---|
| PLACE | AB STORE | O |
|  | STATION | O |
|  | LIBRARY | X |
|  | ... |  |
| GENRE | CLOTHES | O |
|  | CAR | X |
|  | ... |  |
| BULLETIN BOARD/GUIDANCE | TRANSPORTATION | O |
|  | GUIDE MAP | X |
|  | REGULATORY INFORMATION | O |
|  | ... |  |
| SIGNBOARD | ADVERTISEMENT | O |
|  | STORE NAME | X |
|  | ... |  |
| ... | ... | ... |

| TIMING | SETTING | OUTPUT FORM | REMARKS |
|---|---|---|---|
| IMMEDIATELY | × | VOICE | |
| WHEN STOPPED | × | AR IMAGE | |
| WHEN THE SURROUNDINGS ARE NOT CROWDED | ○ | AR IMAGE | |
| WHEN THERE ARE NO CAR RUNNING AROUND | ○ | AR IMAGE | |
| DESTINATION | AB STORE | AR IMAGE | COMPARE WITH STORE INFORMATION |
| REGISTRATION PLACE | STATION, AB STORE, PUBLIC FACILITY | AR IMAGE | |
| HOME | ○ | AR IMAGE | DETECT WITH GPS INFORMATION |
| TIME DESIGNATION | ○ | VOICE | 19:00 |
| ELAPSED TIME DESIGNATION | ○ | VOICE | 30 MINUTES LATER |
| WHEN BROWSING SPECIFIC HOMEPAGE ON TERMINAL | ○ | AR IMAGE | AB STORE, CD STORE |
| ... | ... | ... | ... |

- - - - → DIRECTION OF LINE OF SIGHT
———→ DIRECTION OF MOVEMENT

FOR YOKOHAMA

------▶ DIRECTION OF LINE OF SIGHT
———▶ DIRECTION OF TRAVELING

FOR YOKOHAMA: 30 MINUTES DELAY DUE TO HEAVY RAIN

- - - - ▶ DIRECTION OF LINE OF SIGHT
———▶ DIRECTION OF TRAVELING

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-005971 filed Jan. 18, 2021.

BACKGROUND

(i) Technical Field

The present disclosure relates to an information processing apparatus, an information processing method, and a non-transitory computer readable medium.

(ii) Related Art

Currently, a technology for visually augmenting the reality has been put into practical use by superimposing and displaying the information, which is created by a data processing, on the real world. This technology is called augmented reality (AR).

SUMMARY

A device capable of displaying an augmented-reality image (hereinafter, also referred to as an "AR image") includes a glasses-type device. The glasses-type device may be used in the same way as glasses when it does not display an AR image.

With the widespread use of devices capable of displaying AR images, it is expected that the chances of displaying AR images representing the contents of information in front of the field of view of a user wearing the device will increase.

Meanwhile, even when the surrounding environments of the user and the operating conditions of the user are the same, it is expected that, in one case, the user may want to display the contents of the information whose existence has been detected depending on the time and that, in another case, the user may not want to display the contents of the information depending on the time. For example, the user may not afford to check the contents of the information at that point of time, but the user may want to check the contents of the information later.

Aspects of non-limiting embodiments of the present disclosure relate to enabling display that reflects the user's wish at each time, as compared with a case, at the same time that the existence of information is detected, the contents of the information is displayed as an augmented-reality image in front of the field of view.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: when existence of predetermined information is detected, inquire a user whether to display contents of the information before the contents of the information are displayed as an augmented-reality image in front of a user's field of view; and control the displaying of the contents of the information by the augmented-reality image according to a user's instruction in response to the inquiry.

BRIEF DESCRIPTION OF THE DRAWINGS

Exemplary embodiment(s) of the present disclosure will be described in detail based on the following figures, wherein:

FIG. 3 is a diagram illustrating an example of an inquiry target table;

FIG. 4 is a diagram illustrating an example of a provision timing table;

FIG. 9A illustrates the user heading for an automatic ticket gate, and FIG. 9B illustrates an example of an inquiry from the xR device;

FIGS. 10A and 10B illustrate a case where display is permitted with a designated timing, and FIGS. 10C and 10D illustrate a case where the display is not permitted;

FIG. 11A illustrates a state in which a user stops on a platform and looks at a train bound for Yokohama, and FIG. 11B illustrates the augmented-reality scenery that the user is visually recognizing;

FIG. 12A illustrates a state in which the user stops on the platform and looks at the train bound for Shinagawa, and FIG. 12B illustrates the augmented-reality scenery that the user is visually recognizing;

FIG. 13A illustrates a state in which the user stops at the center of the platform and looks toward the depth direction of the platform, and FIG. 13B illustrates the augmented-reality scenery that the user is visually recognizing;

FIG. 14A illustrates the user heading for the commercial building, FIG. 14B illustrates an example of an inquiry from the xR device 20, and FIG. 14C illustrates an example of an instruction from the user;

FIG. 17A is an example of a user's instruction for an inquiry, and FIG. 17B is an example of provision of the contents of the information by a voice;

FIG. 18A illustrates an example of the inquiry from an xR device, and FIG. 18B illustrates an example of the instruction from a user;

FIG. 19A illustrates a state in which the face of a user is turned toward a station on the way to a commercial building, and FIG. 19B illustrates a difference between a range captured by a camera and a range recognized by a user;

FIG. 20A illustrates an example of an inquiry from the xR device, and FIG. 20B illustrates an example of a case where display is permitted with a designated timing;

FIG. 21A illustrates the user walking toward the entrance of a commercial building which is the destination, and FIG. 21B illustrates an example of presentation of the contents of information;

FIG. 22A illustrates an example of an inquiry from an xR device, FIG. 22B illustrates an example of instructing "display immediately" by a gesture, and FIG. 22C illustrates an example of displaying the contents of information by an AR image;

FIG. 23A illustrates an example of an inquiry from an xR device, FIG. 23B illustrates an example of instructing "display later" by a gesture, and FIG. 23C illustrates an example of displaying the contents of information by an AR image;

FIG. 24A illustrates an example of an inquiry from an xR device, FIG. 24B illustrates an example of instructing "unnecessary" by a gesture, and FIG. 24C illustrates an example in which the contents of information are not displayed;

FIG. 25A illustrates the xR device with the button, FIG. 25B illustrates an example of instructing "display immediately", and FIG. 25C illustrates an example of instructing "display later";

FIG. 26A is an example of using a text for an inquiry, and FIG. 26B is an example of using a mark for an inquiry;

DETAILED DESCRIPTION

Hereinafter, exemplary embodiments of the present disclosure will be described with reference to the drawings.

First Exemplary Embodiment

Entire System Configuration

Figure 1:
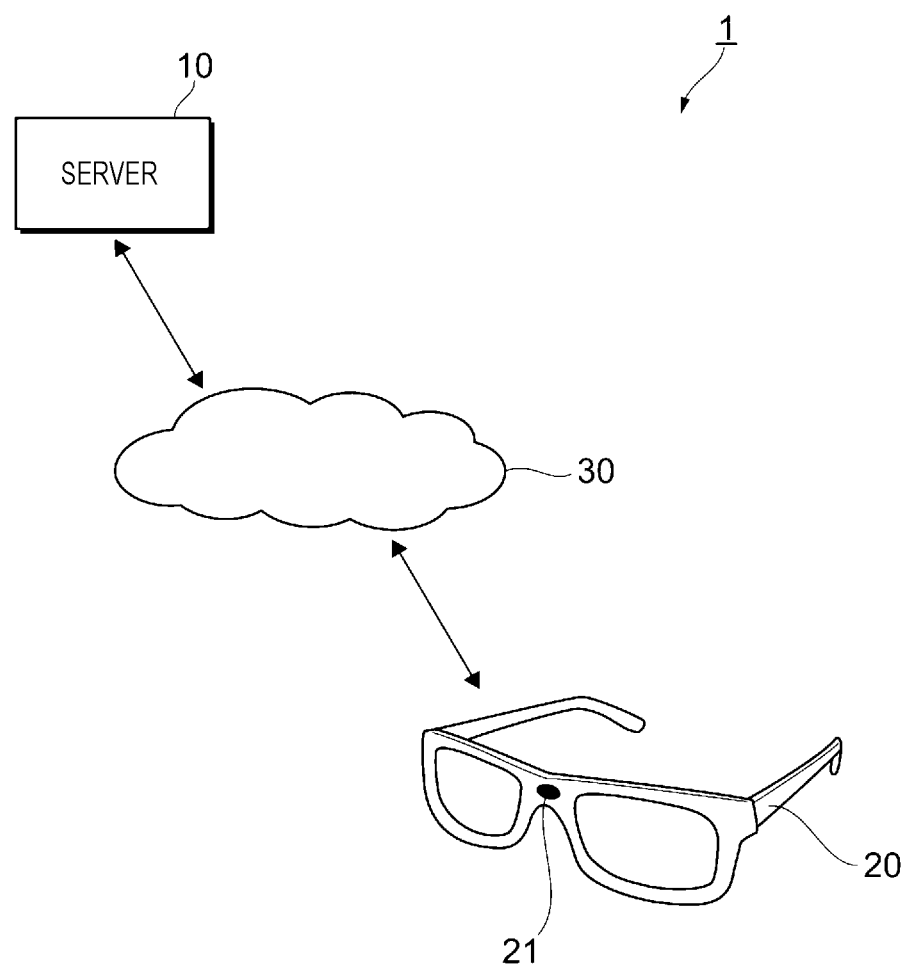
FIG. 1 is a diagram illustrating a usage example of an information processing system used in a first exemplary embodiment.

FIG. 1 is a diagram illustrating a usage example of an information processing system 1 used in a first exemplary embodiment.

The information processing system 1 illustrated in FIG. 1 includes a server 10 and an xR device 20 that are connected to each other via a communication network 30.

Here, the term "connected" refers to a state in which communication is possible.

In the case of FIG. 1, one xR device 20 is connected to the server 10, but plural xR devices 20 may be connected to the server 10.

Further, one xR device 20 may be connected to plural servers 10, or plural xR devices 20 may be connected to plural servers 10.

For example, a wireless LAN (Local Area Network), the Internet, a mobile communication system such as 4G or 5G, and Bluetooth are used for the communication network 30 in FIG. 1.

The server 10 used in the present exemplary embodiment functions as an information processing apparatus that implements an information provision service through a cooperation with the xR device 20.

The xR device 20 used in the present exemplary embodiment is a glasses-type device worn by the user on the head. In the xR device 20 used in the present exemplary embodiment, a camera 21 is attached to the central portion of a frame.

The camera 21 is used as an "imaging unit" that captures an image in front of the user's field of view. The viewing angle of the camera 21 is substantially equal to the viewing angle of a person or equal to or greater than the viewing angle of a person.

However, the camera 21 may be a device capable of capturing a panoramic image or other wide-angle image, or may be a device capable of capturing an image of the entire celestial sphere or half celestial sphere. The panoramic image may be an image that captures 360° in the horizontal direction.

The xR device 20 with the camera 21 is also called an AR glass or an MR (Mixed Reality) glass. In the present exemplary embodiment, the glasses-type devices are collectively referred to as an "xR device". However, the appearance of the xR device 20 is not limited to the glasses type illustrated in FIG. 1, but may be of a head mount type that covers the head, like a hat.

In the present exemplary embodiment, a two-dimensional image is assumed as the AR image, but a three-dimensional image may also be used as the AR image. The three-dimensional image is an image in which distance information is recorded for each pixel, and is also called a "range image". As for the camera 21, a stereo camera or a LiDAR (Light Detection and Ranging) may be used to acquire the three-dimensional image.

Server Configuration

Figure 2:
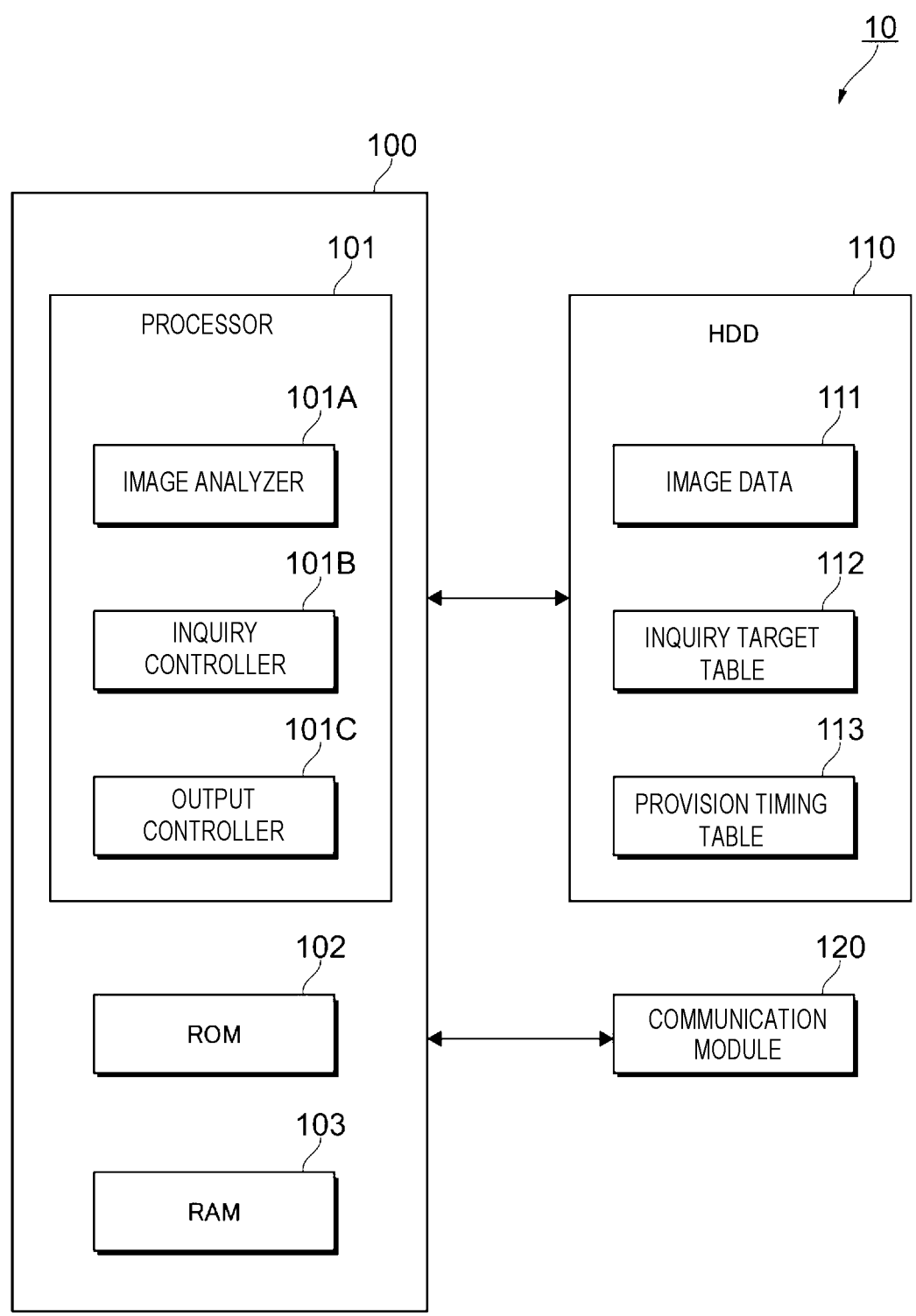
FIG. 2 is a diagram illustrating an example of the hardware configuration of a server used in the first exemplary embodiment.

FIG. 2 is a diagram illustrating an example of the hardware configuration of the server 10 used in the first exemplary embodiment.

The server 10 illustrated in FIG. 2 includes a data processing unit 100, a hard disk drive (HDD) 110, and a communication module 120.

Here, a device compliant with a protocol used for communication via the communication network 30 is used for the communication module 120.

The server 10 may be additionally provided with a display, a keyboard, and a mouse.

The data processing unit 100 includes a processor 101, a Read Only Memory (ROM) 102, and a Random-Access Memory (RAM) 103.

Both the ROM 102 and the RAM 103 are semiconductor memories. The ROM 102 stores a Basic Input Output System (BIOS). The RAM 103 is used as a main storage device used for executing a program. For example, a Dynamic RAM (DRAM) is used for the RAM 103.

The processor 101 includes, for example, a Central Processing Unit (CPU). The processor 101 implements various functions through the execution of a program.

The processor 101 illustrated in FIG. 2 represents an image analyzer 101A, an inquiry controller 101B, and an output controller 101C as a part of the functions implemented by executing the program.

The image analyzer 101A corresponds to a function of analyzing an image obtained by capturing the direction of the user's line of sight (hereinafter, also referred to as "front of the field of view").

The image analyzer 101A has a first analysis function of detecting the existence of predetermined information and a second analysis function of detecting the timing of outputting information to a user.

The first analysis function is used, for example, to detect the existence of predetermined information as the provision target, among various types of information included in the image obtained by capturing the direction of the user's line of sight.

In the present exemplary embodiment, the information as the provision target is registered in an inquiry target table 112.

The second analysis function is used, for example, to detect that the landscape or environment of the image obtained by capturing the direction of the user's line of sight corresponds to the timing of providing information. In the present exemplary embodiment, the timing of providing information is registered in a provision timing table 113.

The inquiry controller 101B corresponds to a function of controlling (i) a process of, when the existence of the information as the provision target is detected, inquiring the user whether to display the detected information before displaying the contents of the detected information in front of the user's field of view and (ii) a process of receiving a response to the inquiry from the user.

The inquiry controller 101B may know the existence of the information as the provision target through the analysis result of the image analyzer 101A or may know it by a notification from the xR device 20.

In the present exemplary embodiment, the result of recognition of characters included in the image is given from the xR device 20. However, the characters included in the image may be recognized by analysis of the image by the server 10.

When a scene corresponding to the output timing is detected by the second analysis function, the output controller 101C corresponds to a function of controlling the output of the contents of the corresponding information.

In the present exemplary embodiment, the contents of the information are output by either displaying the content of the information by the AR image or outputting the contents of the information by voice.

In the case of the output by the AR image, the output controller 101C in the present exemplary embodiment executes generation of the AR image according to the contents of the information, and control of the output position. When the contents of the information are output by voice, the output controller 101C of the present exemplary embodiment generates a voice file corresponding to the contents of the information.

The hard disk drive 110 is an auxiliary storage device using a magnetic disk as a recording medium. In the present exemplary embodiment, the hard disk drive 110 is used as the auxiliary storage device, but a non-volatile rewritable semiconductor memory may be used as the auxiliary storage device. An operating system and application programs are installed on the hard disk drive 110.

In the following, the operating system and the application programs are referred to as "program" without distinguishing between them.

Image data 111, the inquiry target table 112, and the provision timing table 113 are recorded in the hard disk drive 110 illustrated in FIG. 2.

In the present exemplary embodiment, the image data 111 is captured by the camera 21 (see FIG. 1) and uploaded from the xR device 20 (see FIG. 1) at the same time as the capturing.

In the present exemplary embodiment, a moving image is used as the image data 111. However, a still image captured at a predetermined cycle may be used as the image data 111. The capturing cycle is, for example, 5 seconds. Further, the image data 111 may be captured when a change in the direction of the head is detected. The change in the direction of the head may be detected, for example, by a change in acceleration.

FIG. 3 is a diagram illustrating an example of the inquiry target table 112. The inquiry target table 112 illustrated in FIG. 3 includes "target", "contents", and "user setting".

In FIG. 3, "place", "genre", "bulletin board/guidance", and "signboard" are exemplified as examples of "target". "AB store", "station", and "library" are exemplified as examples of "place". "Clothes" and "car" are exemplified as examples of "genre".

The presence or absence of "user setting" is recorded in each content.

The "user setting" here are associated with each user who uses an information provision service. Therefore, even when certain information is detected, it may or may not be provided depending on the user.

In the case of FIG. 3, information on "AB store", "station", "clothes", "transportation", "regulatory information", and "advertisement" is the provision target. Meanwhile, information on "library", "car", "guide map", and "store name" is excluded from the provision target.

This setting may be changed at any time.

FIG. 4 is a diagram illustrating an example of the provision timing table 113. The provision timing table 113 illustrated in FIG. 4 includes "timing", "setting", "output form", and "remarks".

In FIG. 4, "immediately", "when stopped", "when the surroundings are not crowded", "when there are no car running around", "destination", "registration place", "home", "time designation", "elapsed time designation", and "when browsing a specific homepage on a terminal" are exemplified as examples of "timing".

In the case of FIG. 4, "immediately" and "when stopped" are excluded from the output timing. When the user wants to output at these timings, the user needs to designate the timings individually. Other timings are set as output timings.

In the case of FIG. 4, "AB store" is specifically designated as "destination". When the destination has not been designated by the user, the destination column is empty.

Further, in the case of FIG. 4, "station", "AB store", and "public facility" are set as "registration place".

In FIG. 4, "voice" and "AR image" are prepared as "output form" and are set for each individual timing. For example, "voice" is set for "immediately", "time designation", and "elapsed time designation", and "AR image" is set for other timings.

These settings are used when the user permits the provision of the contents of the information and there is no instruction regarding the output form. When the output form instructed by the user is different from a set output form, the user's instruction is given priority.

In the case of FIG. 4, a method of detecting the output timing is described in the "remarks" column. For example, arrival at "destination" is detected by "compare with store information". When the appearance of the target store is used as the store information, the arrival at the destination is determined by comparison with the image data 111 (see FIG. 2). Further, when the coordinate value of the store is used as the store information, the arrival at the destination is determined by comparison with the current location positioned by using a GPS signal. The same applies to arrival at "home". In FIG. 4, it is described that GPS information is used.

Further, as for "time designation", "19:00" is designated by the user. Similarly, as for "elapsed time designation", "30 minutes later" is designated by the user.

Each hour and time may be registered as a response to an inquiry, but may also be registered in advance.

Further, as for "when browsing a specific homepage on a terminal", "AB store" and "CD store" are registered as specific homepages. Browsing of a specific homepage is detected by analysis of the image data 111 (see FIG. 2) captured by the camera 21 (see FIG. 1).

xR Device Configuration

Figure 5:
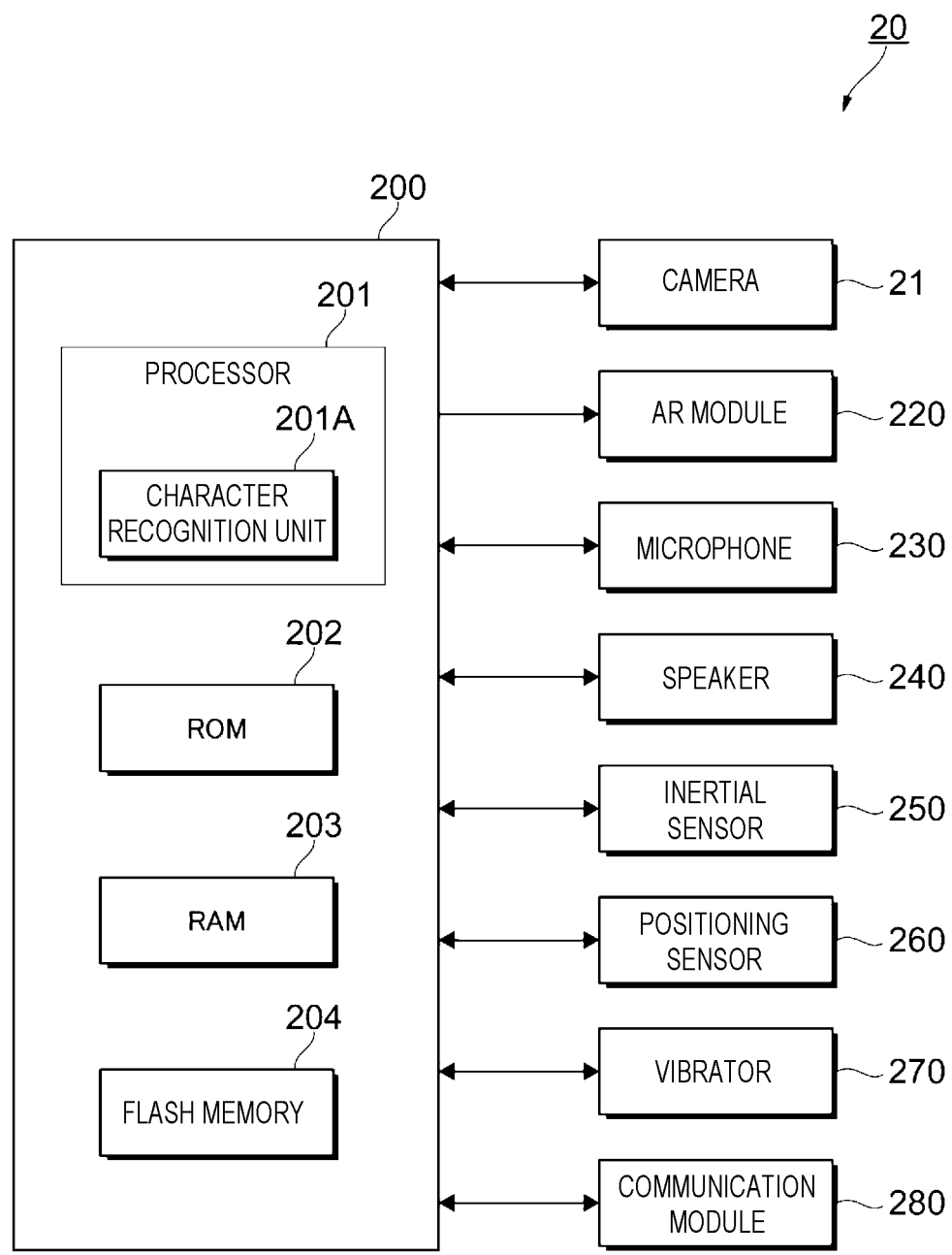
FIG. 5 is a diagram illustrating an example of the hardware configuration of an xR device used in the first exemplary embodiment.

FIG. 5 is a diagram illustrating an example of the hardware configuration of the xR device 20 used in the first exemplary embodiment.

The xR device 20 illustrated in FIG. 5 includes a data processing unit 200, a camera 21, an AR module 220, a microphone 230, a speaker 240, an inertial sensor 250, a positioning sensor 260, a vibrator 270, and a communication module 280.

The data processing unit 200 includes a processor 201, a ROM 202, a RAM 203, and a flash memory 204.

The ROM 202, the RAM 203, and the flash memory 204 are all semiconductor memories. A BIOS is stored in the ROM 202. The RAM 203 is a main storage device used for executing a program. For example, a DRAM is used for the RAM 203.

The flash memory 204 is used for recording firmware, programs, and data files. The flash memory 204 is used as an auxiliary storage device.

The processor 201 includes, for example, a CPU. The processor 201 implements various functions through the execution of a program.

The processor 201 implemented in FIG. 5 represents a character recognition unit 201A as a portion of the functions implemented by executing the program.

The character recognition unit 201A corresponds to a function of recognizing characters included in an image obtained by capturing the direction of the user's line of sight.

The character recognition unit 201A in the present exemplary embodiment converts a recognized character string into a text string and outputs the text string. In the present exemplary embodiment, the character recognition is completely executed by the processor 201, but the text string may be output in cooperation with another device having a character recognition function. An artificial intelligence technology may be applied to the character recognition.

Further, the server 10 (see FIG. 1) may be used for another device. In that case, the server 10 may also be provided with the character recognition unit 201A.

Further, a server specialized in character recognition may be used as another device.

For example, a CMOS image sensor or a CCD image sensor is used for the camera 21. The number of cameras 21 may be one or more. In the example of FIG. 5, there is only one camera 21.

For example, when two cameras 21 are used, the two cameras 21 are arranged at both ends of the front portion of a frame. By using the two cameras 21, stereo imaging becomes possible, which makes it possible to measure a distance to a subject and estimate the anteroposterior relationship between subjects.

The AR module 220 is a module that implements the visual recognition of augmented reality obtained by synthesizing an AR image with a real landscape, and includes optical components and electronic components.

Typical methods of the AR module 220 include a method of arranging a half mirror in front of the user's eye, a method of arranging a volume hologram in front of the user's eye, and a method of arranging a blazed diffraction grating in front of the user's eye.

The microphone 230 is a device that converts a user's voice and ambient sound into an electric signal.

The speaker 240 is a device that converts an electric signal into sound and outputs the sound. The speaker 240 may be a bone conduction speaker or a cartilage conduction speaker.

The speaker 240 may be a device independent of the xR device 20, such as a wireless earphone. In this case, the speaker 240 is connected to the xR device 20 by Bluetooth or the like.

The inertial sensor 250 includes, for example, a 6-axis sensor. The 6-axis sensor includes a 3-axis acceleration sensor and a 3-axis angular velocity sensor. The motion of the user wearing the xR device 20 is estimated from the output of the inertial sensor 25. In the present exemplary embodiment, it is detected by the output of the inertial sensor 250 that the user has stopped.

The positioning sensor 260 is a GPS module that positions the position of its own terminal by receiving GPS signals transmitted from, for example, three or more Global Positioning System (GPS) satellites. The positioning by receiving GPS signals transmitted from GPS satellites is limited to outdoors.

Further, an indoor positioning module may be separately prepared as the positioning sensor 260. The indoor positioning module includes, for example, a module that receives a Bluetooth Low Energy (BLE) beacon and determines the position of its own terminal, a module that receives a Wi-Fi (registered trademark) signal and determines the position of its own terminal, a module that determines the position of its own terminal by autonomous navigation, and a module that receives an Indoor Messaging System (IMES) signal and determines the position of its own terminal.

The vibrator 270 is a device that generates continuous vibration or intermittent vibration. In the present exemplary embodiment, the vibration of the vibrator 270 is used, for example, for the purpose of notifying the user that the existence of information that may be provided has been detected.

The communication module 280 uses a device compliant with the protocol of the communication network 30 and is also used for communication with an external device. For example, Wi-Fi (registered trademark) or Bluetooth (registered trademark) is used for communication with the external device.

Figure 6:
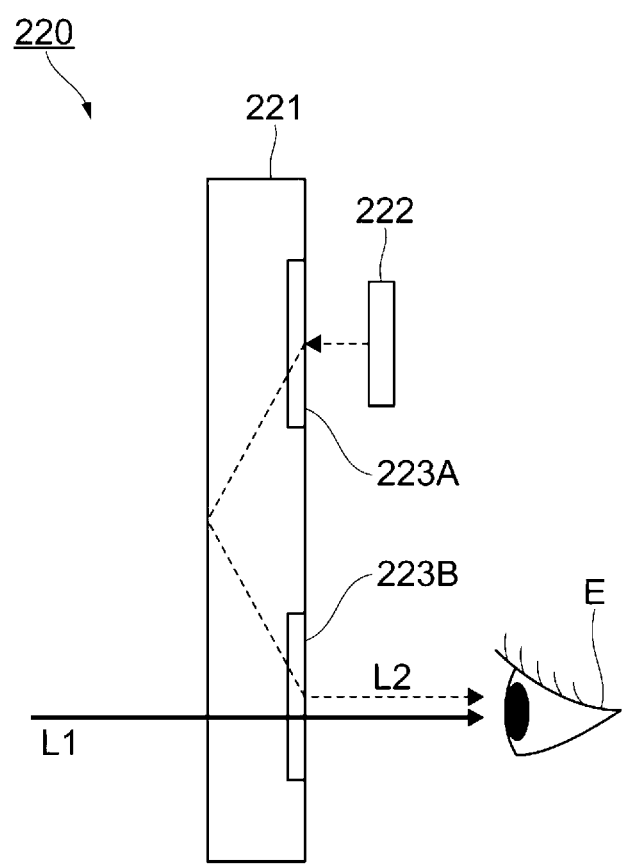
FIG. 6 is a diagram illustrating a conceptual configuration example of an AR module.

FIG. 6 is a diagram illustrating a conceptual configuration example of the AR module 220. The AR module 220 illustrated in FIG. 6 corresponds to a method of arranging a blazed diffraction grating in front of the user's eye.

The AR module 220 illustrated in FIG. 6 includes a light guide plate 221, a micro display 222, a diffraction grating 223A to which image light L2 is input, and a diffraction grating 223B from which the image light L2 is output.

The light guide plate 221 corresponds to a lens of eyeglasses. The light guide plate 221 has a transmittance of, for example, 85% or more. Therefore, the user may directly see the scenery in front of the light guide plate 221 through the light guide plate 221. External light L1 travels straight so as to pass through the light guide plate 221 and the diffraction grating 223B, and is incident on the user's eye E.

The micro display 222 is a display device that displays an AR image to be visually recognized by the user. The light of the AR image displayed on the micro display 222 is projected as the image light L2 onto the light guide plate 221. The image light L2 is refracted by the diffraction grating 223A and reaches the diffraction grating 223B while reflecting the inside of the light guide plate 221. The diffraction grating 223B refracts the image light L2 in the direction of the user's eye E.

This causes the external light L1 and the image light L2 to be simultaneously incident on the user's eye E. As a result, the user recognizes the presence of the AR image in front of the line of sight.

Processing Operation

Hereinafter, a processing operation executed by cooperation between the server 10 and the xR device 20 will be described with reference to FIGS. 7 and 8.

Figure 7:
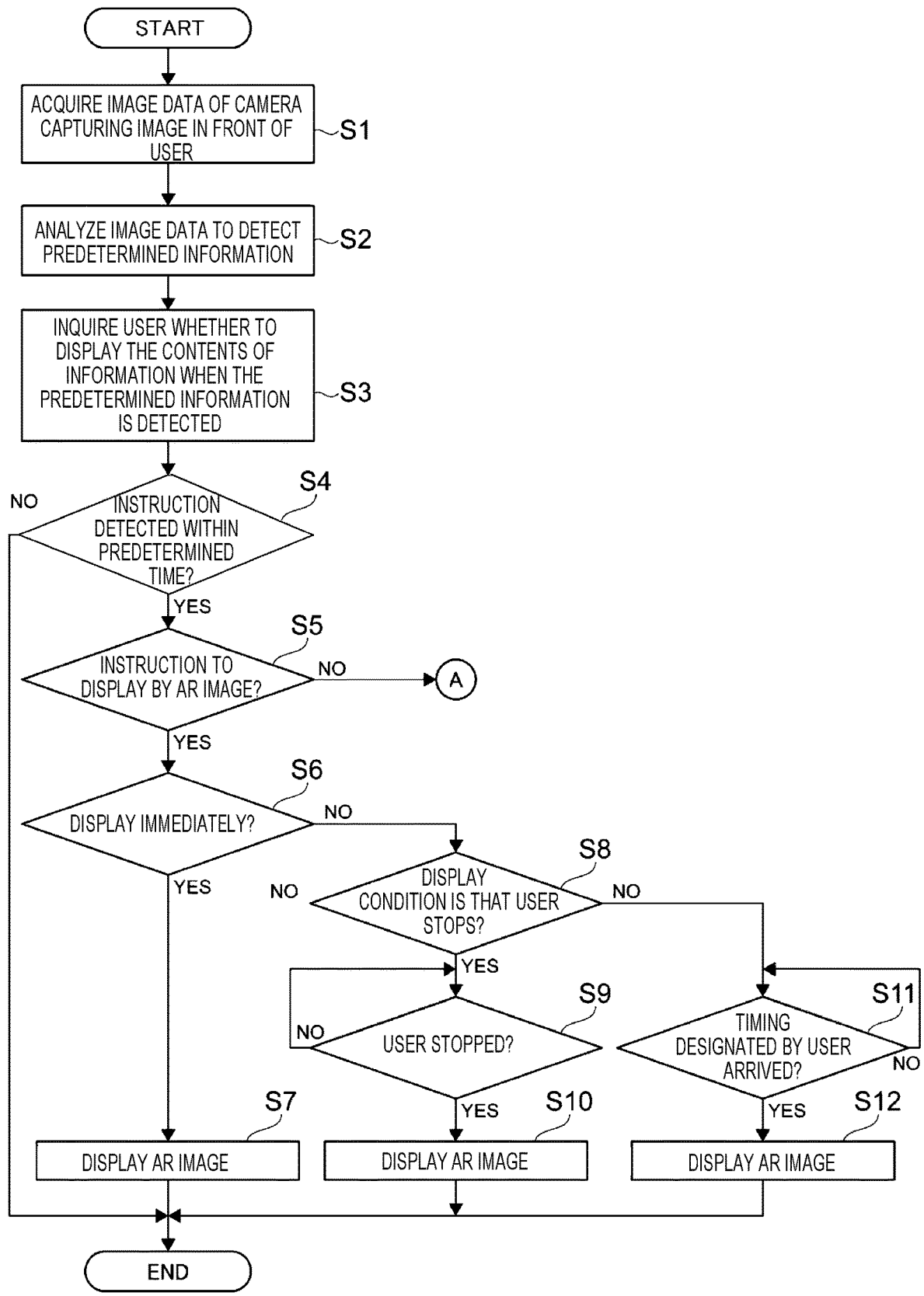
FIG. 7 is a flowchart of a portion of a processing operation in the first exemplary embodiment.

FIG. 7 is a flowchart of a portion of the processing operation in the first exemplary embodiment. Further, FIG. 8 is a flowchart of the remaining processing operations in the first exemplary embodiment.

Figure 8:
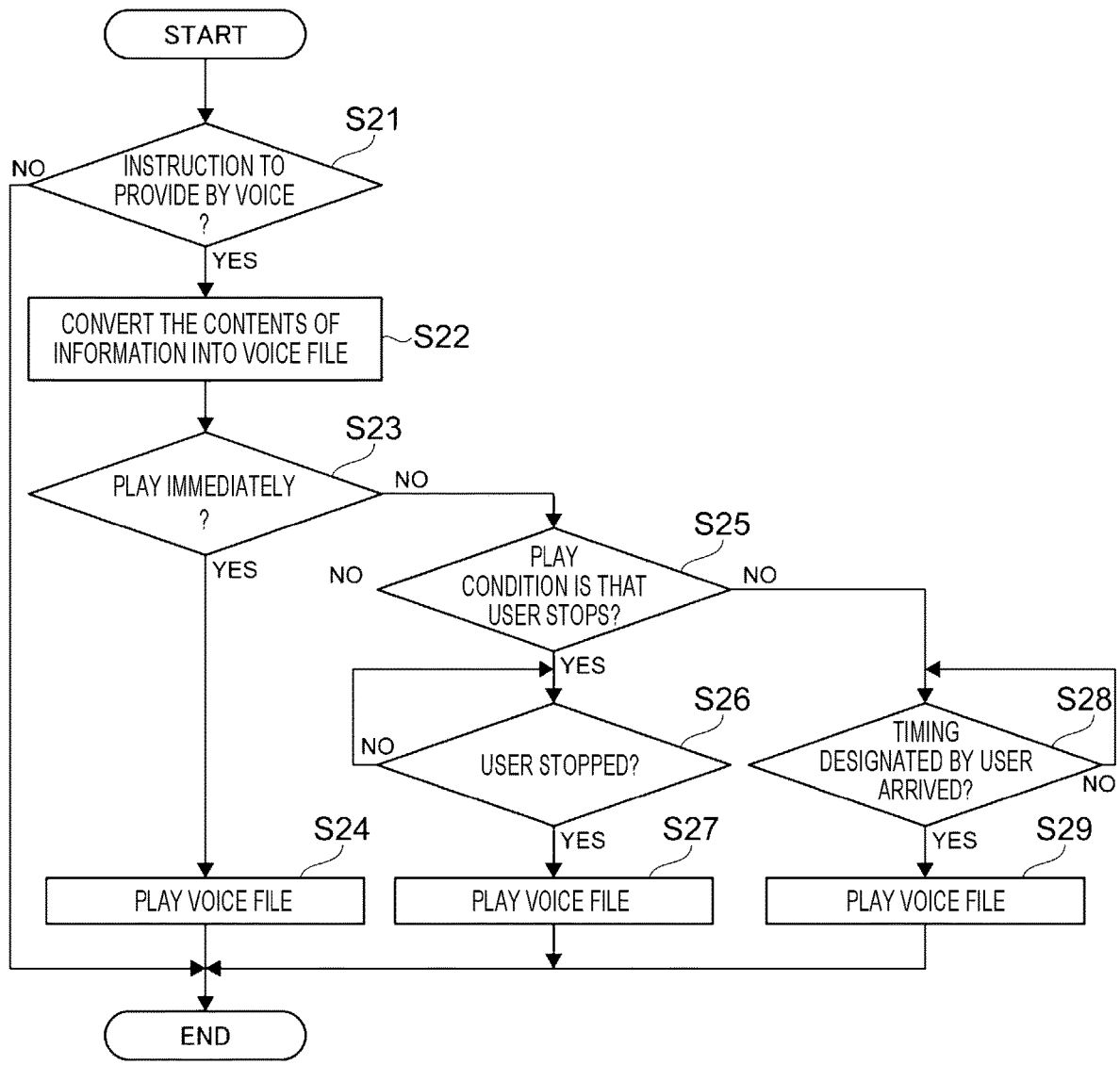
FIG. 8 is a flowchart of the remaining processing operations in the first exemplary embodiment.

The processing operation illustrated in FIGS. 7 and 8 is an example. Further, symbol S in each figure is an abbreviation of the word "step".

In the present exemplary embodiment, it is assumed that the processing operation illustrated in FIGS. 7 and 8 is implemented through the execution of a program by the processor 101 (see FIG. 2) of the server 10 (see FIG. 2).

The processor 101 immediately acquires image data of the camera 21 (see FIG. 1) that is capturing an image in front of the user (step 1). In the present exemplary embodiment, the image data output from the camera 21 is uploaded to the server 10 almost at the same time as the image capturing. Further, depending on the angle of view captured by the camera 21, the image data also includes a landscape other than the front of the user.

Next, the processor 101 analyzes the image data to detect predetermined information (step 2). The predetermined information is detected by collation with the inquiry target table 112 (see FIG. 3). Therefore, information that is not set as the inquiry target is not regarded as the detection in step 2.

When the predetermined information is detected, the processor 101 inquires the user whether to display the contents of the information (step 3). In the present exemplary embodiment, a method that does not use vision, such as sound or voice, is used for the inquiry. The sound or voice is output from the speaker 240 (see FIG. 5) of the xR device 20 (see FIG. 5).

Next, the processor 101 determines whether an instruction has been detected within a predetermined time (step 4).

In the present exemplary embodiment, voice is assumed as an instruction from the user. The predetermined time is preferably set for each user. However, when there is no user setting, an initial value is used. For example, 10 seconds is used for the predetermined time.

In consideration of a case where the user does not notice the inquiry, the inquiry in step 3 may be executed again when the time has elapsed for the first time.

When the user's instruction is not detected even after the predetermined time has elapsed, the processor 101 obtains a negative result in step 4. In this case, a negative denial by the user who does not want to display is included in the negative result, which is a so-called ignorance.

When the negative result is obtained in step 4, the processor 101 ends the process without providing the contents of the detected information to the user.

On the other hand, when the user's instruction is detected within the predetermined time, the processor 101 obtains an affirmative result in step 4.

When the affirmative result is obtained in step 4, the processor 101 determines whether there is an instruction to display by an AR image (step 5).

When an affirmative result is obtained in step 5, the processor 101 determines whether "display immediately" is instructed (step 6). The instruction here may be given by the user each time, or may be set in the provision timing table 113.

When an affirmative result is obtained in step 6, the processor 101 displays an AR image (step 7). This AR image contains the content of the detected information.

On the other hand, when a negative result is obtained in step 6, the processor 101 determines whether a display condition is that the user stops (step 8). In this case as well, an instruction to display at the time when the user stops, that is, when the user stops walking, may be given from the user each time, or may be set in the provision timing table 113.

When an affirmative result is obtained in step 8, the processor 101 determines whether the user has stopped (step 9).

In the present exemplary embodiment, the processor 101 repeats the determination in step 9 while a negative result is obtained in step 9.

Eventually, when the user stops and an affirmative result is obtained in step 9, the processor 101 displays an AR image (step 10). When the output condition is changed while the determination in step 9 is repeated, the arrival of the changed condition is determined. For example, when the user gives an instruction to "display immediately" while the determination in step 9 is repeated, the AR image is immediately displayed.

When a negative result is also obtained in step 8, that is, when the contents of the user's instruction are neither "display immediately" nor "a display condition is that the user stops", the processor 101 determines whether the timing designated by the user has arrived (step 11).

This timing may be specifically instructed by the user each time, or may be set in the provision timing table 113.

In any case, the processor 101 repeats the determination in step 11 while a negative result is obtained in step 11.

Eventually, when the provision timing arrives, the processor 101 displays an AR image (step 12). When the output condition is changed while the determination in step 11 is repeated, the arrival of the changed condition is determined. For example, when the user gives an instruction to "display immediately" while the determination in step 11 is repeated, the AR image is immediately displayed.

Subsequently, a case where a negative result is obtained in step 5 will be described. The processing operation in this case is illustrated in FIG. 8.

When the negative result is obtained in step 5, the processor 101 determines whether there is an instruction to provide by voice (step 21).

When the user explicitly utters a voice such as "unnecessary", the processor 101 obtains a negative result in step 21. In this case, the processor 101 ends the process without providing the contents of the detected information to the user.

On the other hand, when an affirmative result is obtained in step 21, the processor 101 converts the contents of the information into a voice file (step 22).

Subsequently, the processor 101 determines whether "play immediately" has been instructed (step 23). The instruction here may be given by the user each time, or may be set in the provision timing table 113.

When an affirmative result is obtained in step 23, the processor 101 plays the voice file (step 24). In this case, a voice is output from the speaker 240 (see FIG. 5) of the xR device 20 (see FIG. 5).

On the other hand, when a negative result is obtained in step 23, the processor 101 determines whether a playback condition is that the user stops (step 25). In this case as well, an instruction to play at the time when the user stops, that is, when the user stops walking, may be given from the user each time, or may be set in the provision timing table 113.

When an affirmative result is obtained in step 25, the processor 101 determines whether the user has stopped (step 26).

In the present exemplary embodiment, the processor 101 repeats the determination in step 26 while a negative result is obtained in step 26. When the output condition is changed while the determination in step 26 is repeated, the arrival of the changed condition is determined. For example, when the user gives an instruction to "play immediately" while the determination in step 26 is repeated, the voice is immediately played.

Eventually, when the user stops and an affirmative result is obtained in step 26, the processor 101 plays the voice file (step 27).

When a negative result is also obtained in step 25, that is, when the contents of the user's instruction are neither "play immediately" nor "a playback condition is that the user stops", the processor 101 determines whether the timing designated by the user has arrived (step 28). This timing may be specifically instructed by the user each time, or may be set in the provision timing table 113.

In any case, the processor 101 repeats the determination in step 28 while a negative result is obtained in step 28.

Eventually, when the provision timing arrives, the processor 101 plays the voice file (step 29). When the playback condition is changed while the determination in step 28 is repeated, the arrival of the changed condition is determined. For example, when the user gives an instruction to "play immediately" while the determination in step 28 is repeated, the voice is immediately played.

Examples of Presentation of Contents of Information

Hereinafter, examples of presentation of the contents of information according to the present exemplary embodiment will be described with reference to FIGS. 9A to 21B.

Example 1

Here, it is assumed that the contents of the operation information posted on an electric bulletin board in a station yard are provided as an AR image to a user.

Figure 9A:
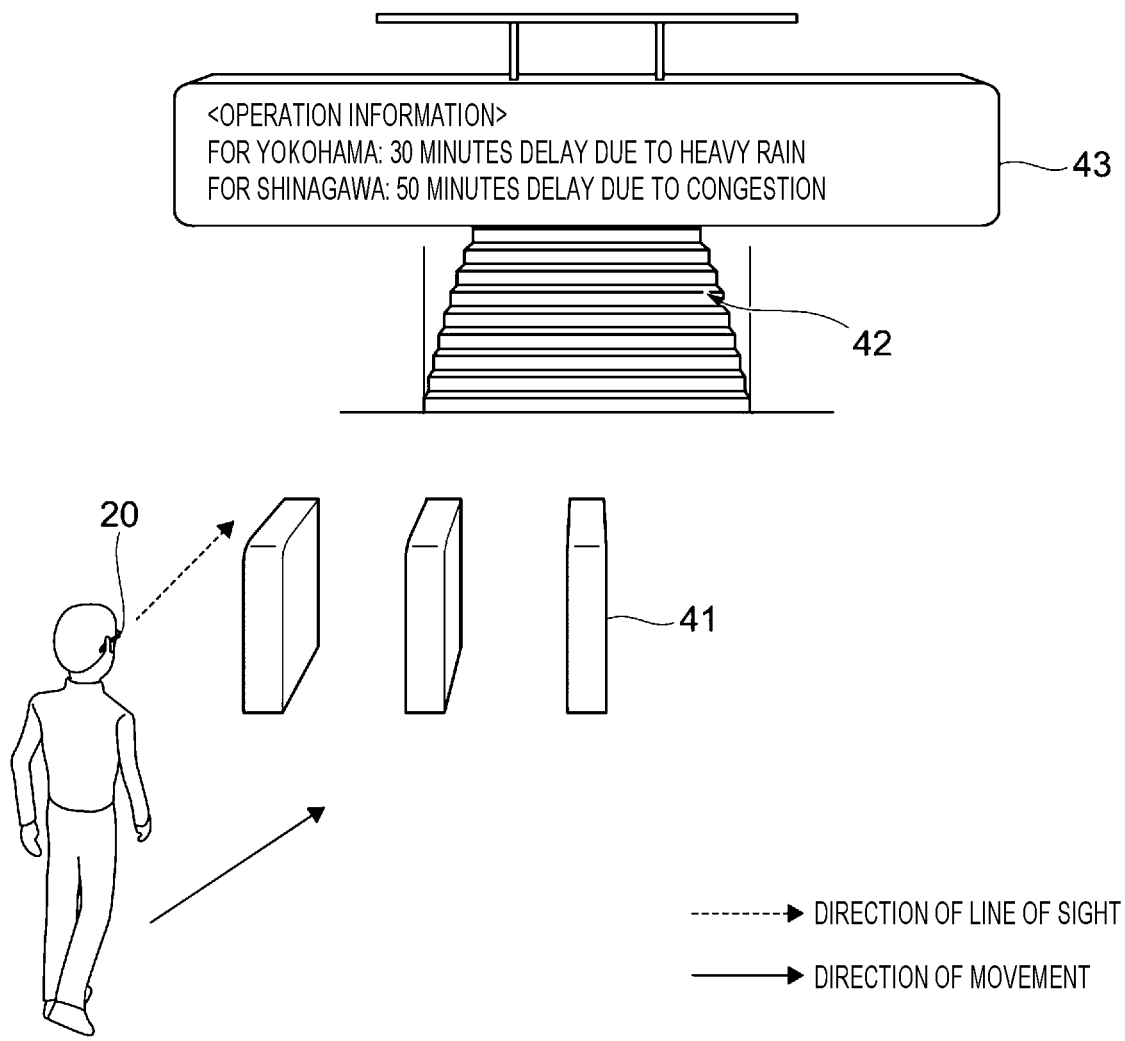
FIGS. 9A and 9B are diagrams illustrating a scene in which a user wearing an xR device heads for a station.
Figure 9B:
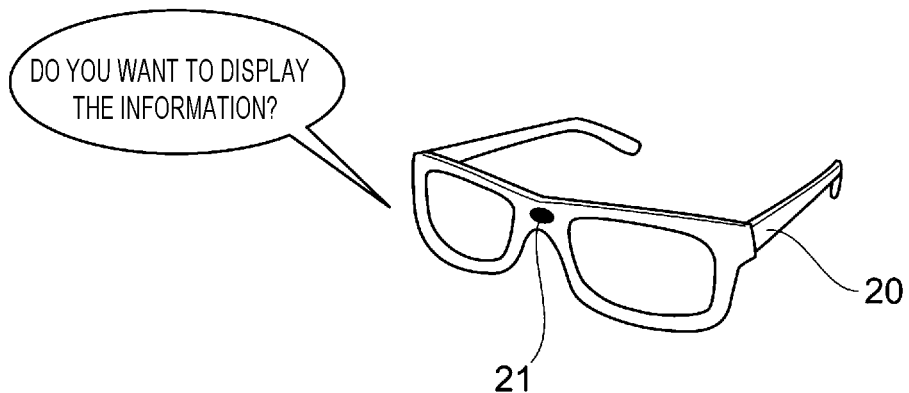

FIGS. 9A and 9B are diagrams illustrating a scene in which a user wearing the xR device 20 heads for a station. FIG. 9A illustrates the user heading for an automatic ticket gate 41, and FIG. 9B illustrates an example of an inquiry from the xR device 20.

In the case of FIGS. 9A and 9B, there are stairs 42 connected to a platform behind the automatic ticket gate 41, and an electric bulletin board 43 is arranged between the stairs 42 and the automatic ticket gate 41. The electric bulletin board 43 hangs from a ceiling.

The camera 21 of the xR device 20 is capturing an image in front of the user. Therefore, the camera 21 captures the electric bulletin board 43 on the way to the automatic ticket gate 41. In this example, the image captured by the camera 21 is uploaded to and analyzed by the server 10 (see FIG. 1) at the same time as the image capturing.

As a result of the image analysis, when the existence of the operation information notifying a train delay is detected, the xR device 20 outputs a voice that inquires the user whether to display the contents of the information, as illustrated in FIG. 9B. The notification of the existence of the operation information is registered in the inquiry target table 112 (see FIG. 3). Further, even when information not registered as the inquiry target is included in the image captured by the camera 21 (see FIG. 1), the inquiry is not executed.

In the example of FIG. 9B, a voice "Do you want to display the information?" is being output. In the present exemplary embodiment, at the stage of inquiry, nothing is provided about the contents of the information, but only the fact that the information that may be displayed as an AR image is detected is represented.

In this way, in the present exemplary embodiment, every time the information is detected, the user is not provided with all the contents of the detected information, but the possibility of displaying the information is inquired.

The reason for making an inquiry before the contents of the information are displayed is that the user does not want to display the AR image immediately, for example, when walking in a crowd or when it is necessary to check the safety of the surroundings. However, In the present exemplary embodiment, the display of the AR image is not uniformly prohibited, but the display of the AR image may be performed immediately when the user desires.

That is, in the method of the present exemplary embodiment, the display, non-display, display timing, etc. of the AR image are determined by checking the convenience of the user, which may not be determined only by the surrounding environments, which are acquired by the camera 21, and the user's motion.

Figure 10A:
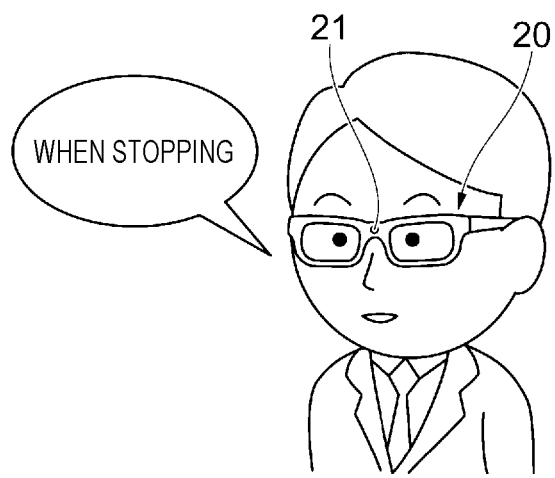
FIGS. 10A to 10D are diagrams illustrating an example of a user's instruction for an inquiry.
Figure 10B:
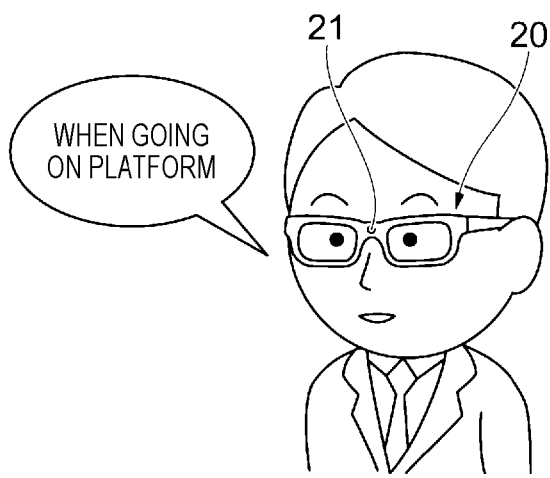
Figure 10C:
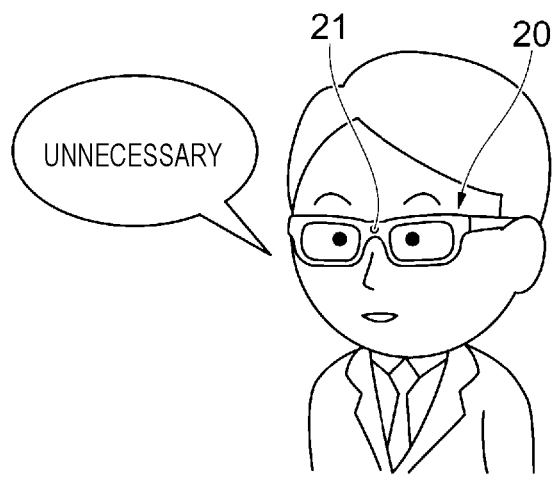
Figure 10D:
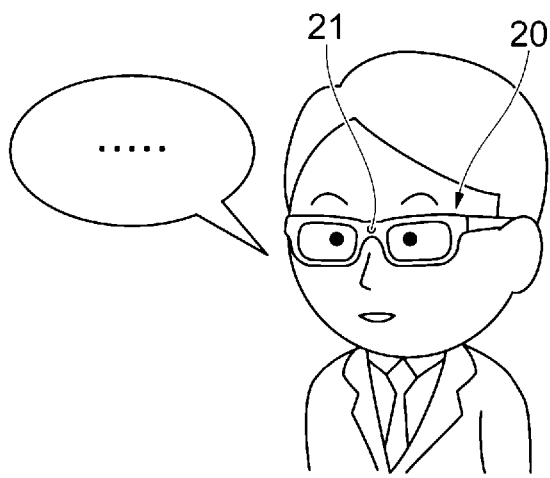

FIGS. 10A to 10D are diagrams illustrating an example of a user's instruction for an inquiry. FIGS. 10A and 10B illustrate a case where display is permitted with a designated timing, and FIGS. 10C and 10D illustrate a case where display is not permitted.

In the case of FIG. 10A, the user is instructing "when stopping". This instruction designates the timing at which an AR image is output, through the identification of the user's action or motion.

The fact that the user has stopped may be determined from the output waveform of the inertial sensor 250 (see FIG. 5) provided in the xR device 20. It is also possible to make the determination from the output of the positioning sensor 260 (see FIG. 5) using a GPS signal. It is also possible to determine that the user has stopped from the image captured by the camera 21.

This instruction corresponds to the case where the affirmative result is obtained in step 9 (see FIG. 7).

In the case of FIG. 10B, the user is instructing "when going on platform". This instruction designates the timing at which the AR image is output, through the identification of the surrounding environments around the user.

In the case of these instructions, the contents of the operation information will not be provided by the AR image until the conditions are satisfied. This instruction corresponds to the case where the negative result is obtained in step 11 (see FIG. 7).

In the case of FIG. 10C, the user is instructing "unnecessary". This instruction is an example of positive denial by words.

In the case of FIG. 10D, the user remains silent or does not speak words related to permission or non-permission. When a predetermined time elapses without an explicit instruction for the inquiry, the negative result is obtained in step 4 (see FIG. 7). This condition is an example of negative denial.

In any case, when the user moves without stopping until he/she arrives at the platform, the AR image will not be displayed in front of the user's field of view while the user approaches the automatic ticket gate 41, while the user passes through the automatic ticket gate 41, and while the user goes up the stairs to the platform.

Figure 11A:
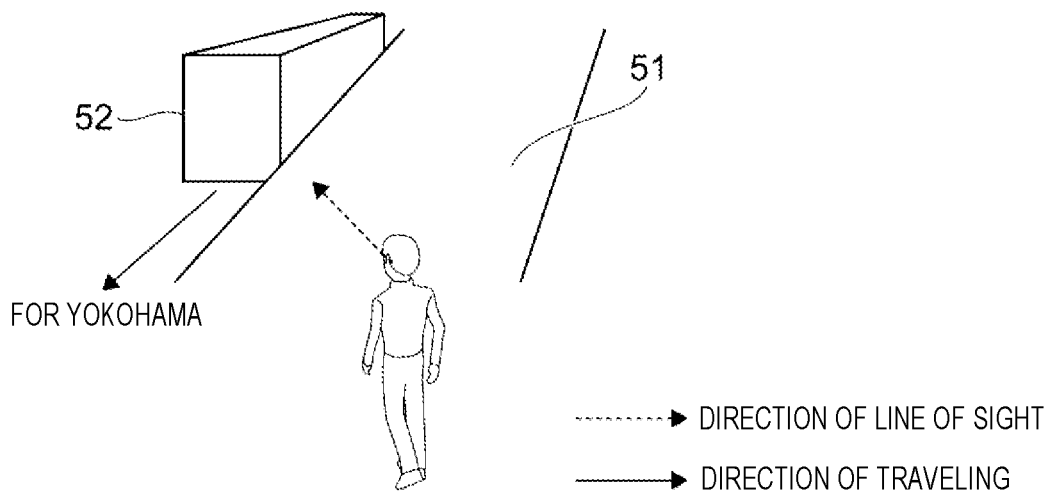
FIGS. 11A and 11B are diagrams illustrating an example of provision of the contents of operation information by an AR image.
Figure 11B:
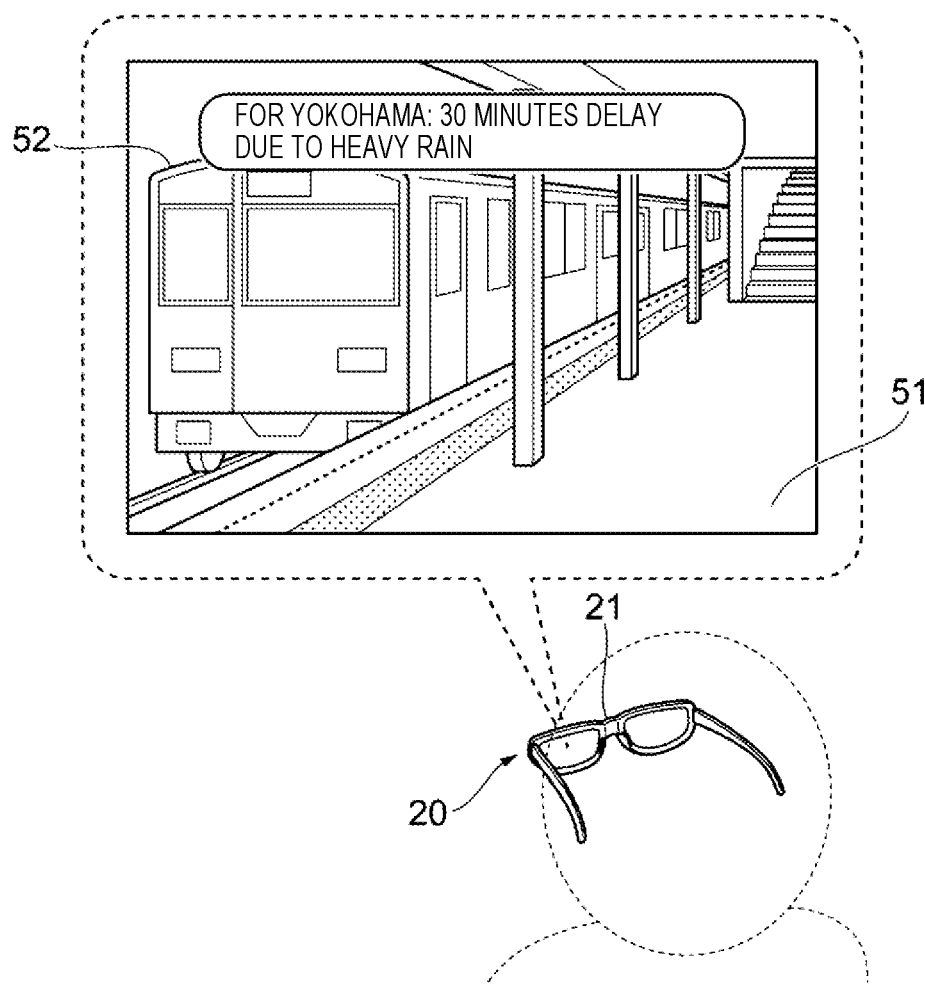

FIGS. 11A and 11B are diagrams illustrating an example of provision of the contents of operation information by an AR image. FIG. 11A illustrates a state in which the user stops on a platform 51 and looks at a train 52 bound for Yokohama, and FIG. 11B illustrates the augmented-reality scenery that the user is visually recognizing.

In the case of FIGS. 11A and 11B, the user is standing still on the platform 51. Therefore, both the condition of "when stopping" and the condition of "when going on platform" are satisfied.

In general, since the condition of "when going on platform" is first satisfied, at the point of time when the analysis of the image captured by the camera 21 reveals that the user is on the platform, the contents of the detected information are displayed as an AR image.

In the example of FIGS. 11A and 11B, since it is possible to recognize from the image that the direction of the user's line of sight is in the train 52 heading toward Yokohama, only the operation information related to the train stopped in the direction of the user's line of sight is displayed. Specifically, the specific contents of the operation information are presented in text, such as "For Yokohama: 30 minutes delay due to heavy rain".

In addition, there is a possibility that the information is updated between the time when the existence of the operation information is detected and the time when the condition is satisfied. Therefore, the processor 201 (see FIG. 5) of the xR device 20 may acquire the latest information from the Internet before displaying the operation information, and may display the latest operation information as an AR image on the platform. The latest operation information may be acquired from the homepage of a railway company of a route to be used, or may be acquire from the homepage of a company that provides the operation information as a service.

When the network environment is poor and it is difficult to access the above-mentioned homepage, the AR image generated by the server 10 (see FIG. 1) may be output as it is. In that case, the hour when the contents of the information are acquired, and the elapsed time from the acquisition may be displayed together as the AR image.

Further, when the character recognition unit 201A (see FIG. 5) of the xR device 20 may recognize the contents of the latest operation information from the electric bulletin board installed on the platform, the character information recognized from the electric bulletin board may be displayed as the AR image.

With the above functions, the contents of the operation information may be displayed in front of the eyes at the timing designated by the user.

Figure 12A:
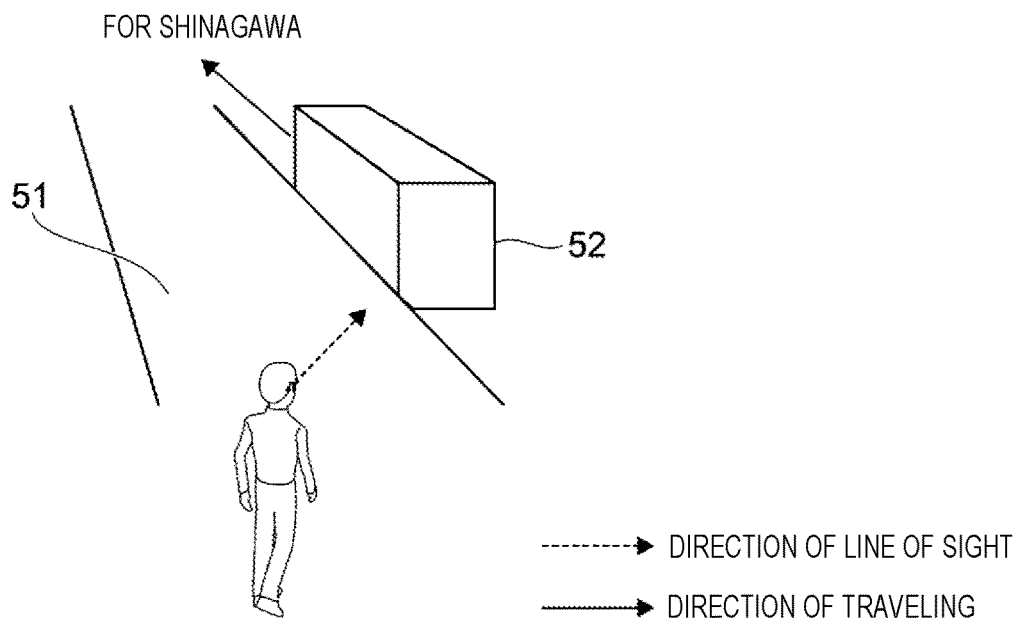
FIGS. 12A and 12B are diagrams illustrating another example of provision of the contents of the operation information by the AR image.
Figure 12B:
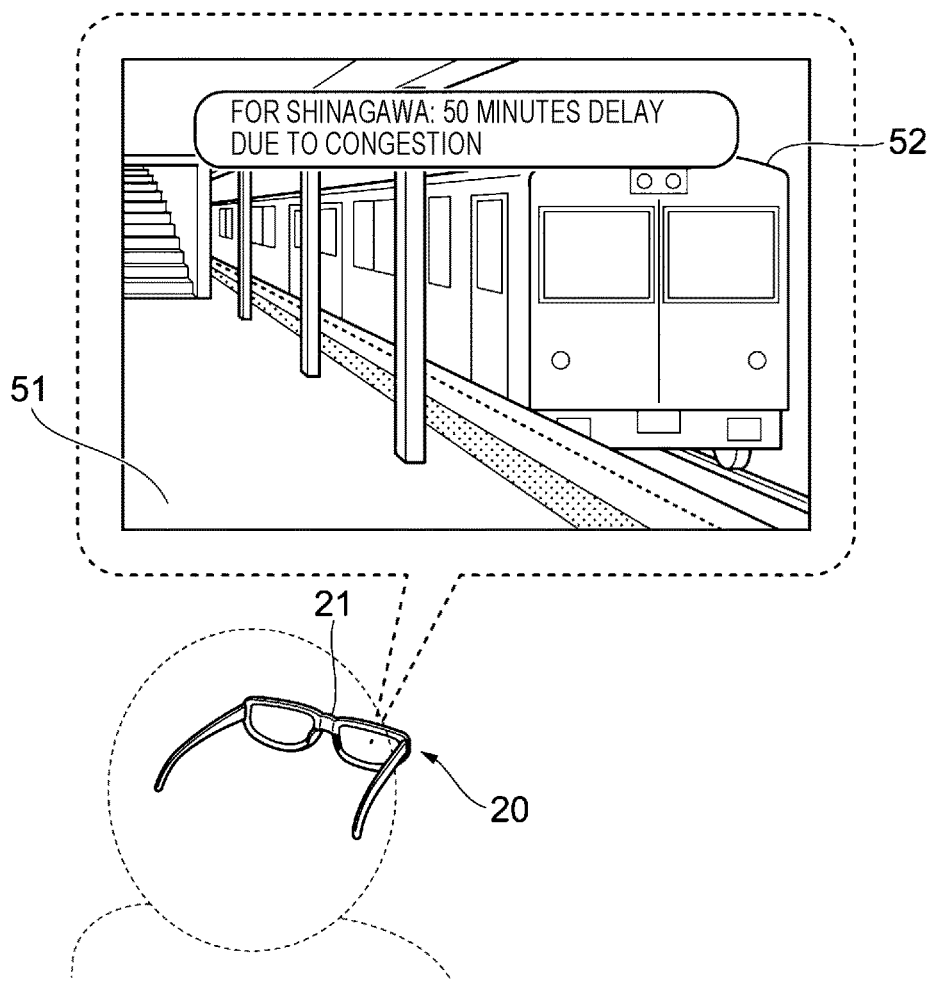

FIGS. 12A and 12B are diagrams illustrating another example of provision of the contents of the operation information by the AR image. FIG. 12A illustrates a state in which the user stops on the platform 51 and looks at the train 52 bound for Shinagawa, and FIG. 12B illustrates the augmented-reality scenery that the user is visually recognizing.

In FIGS. 12A and 12B, portions corresponding to those in FIGS. 11A and 11B are denoted by the corresponding reference numerals.

In the case of FIGS. 12A and 12B, the user is looking at the train 52 heading in the direction opposite to that of FIGS. 11A and 11B. Therefore, the contents of the operation information displayed as the AR image is also the contents related to the destination of the train 52 in a direction of the line of sight. Specifically, the contents "For Shinagawa: 50 minutes delay due to congestion" are displayed.

In this way, when the contents of the information are related to a specific direction, place, and region, and the direction of the user's line of sight specified by image analysis is related to the direction, place, and region, the contents of the information associated with the direction of the user's line of sight is displayed as the AR image to the user.

By providing this function in the server 10 or the xR device 20, a mismatch between the displayed contents and the direction of the user's line of sight is reduced.

Surely, even when the image captured by the camera 21 is analyzed, the relevance to the contents of the information may not be known. In such a case, delay information about both the direction of Yokohama and the direction of Shinagawa is displayed as the AR image regardless of whether the user is looking at the train bound for Yokohama or the train bound for Shinagawa.

Figure 13A:
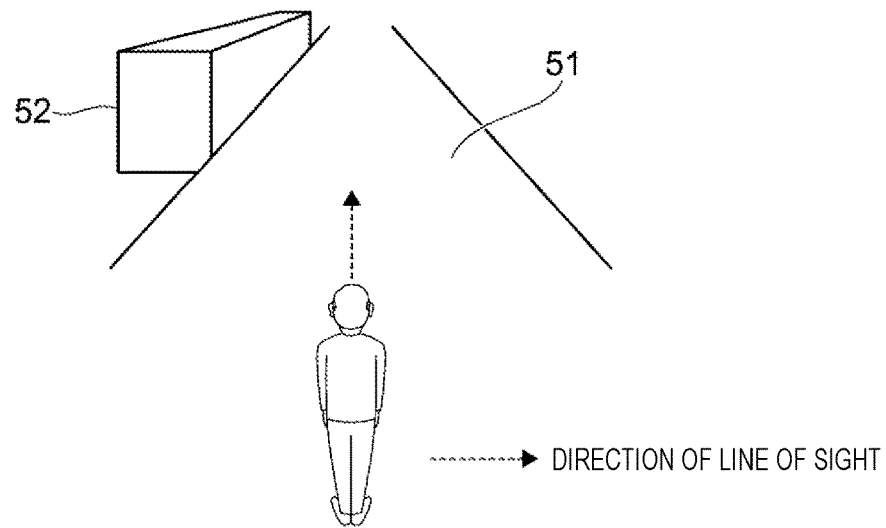
FIGS. 13A and 13B are diagrams illustrating another example of provision of the contents of the operation information by the AR image.
Figure 13B:
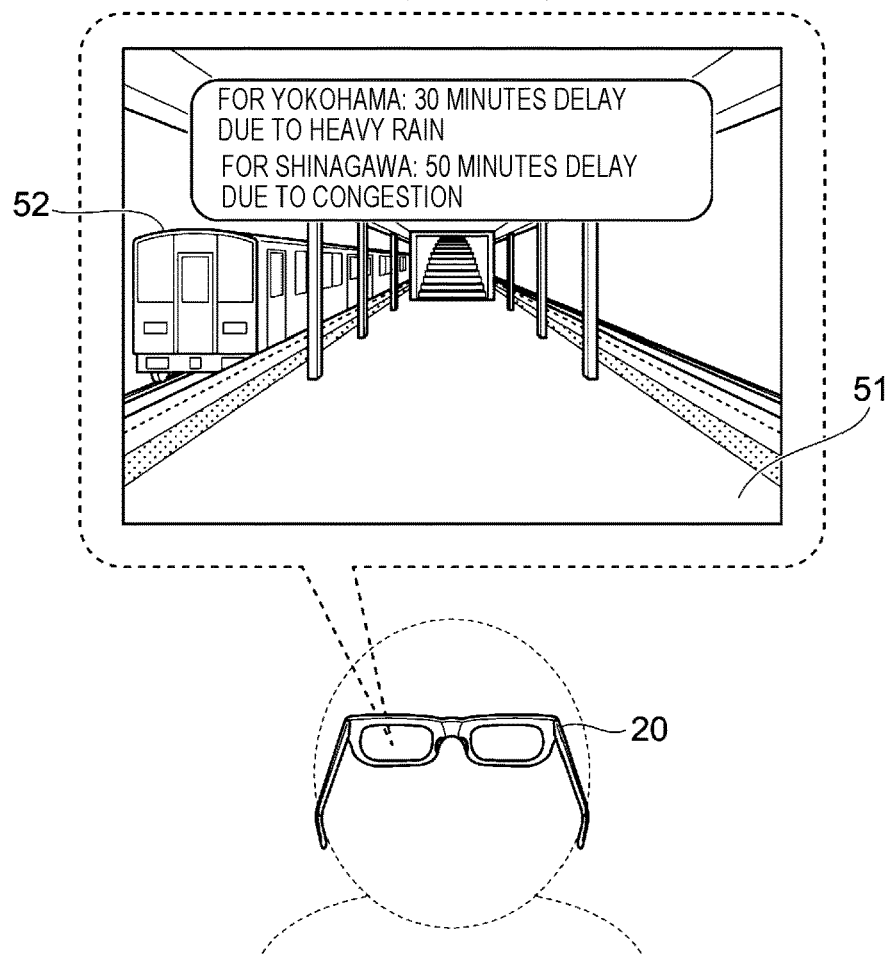

FIGS. 13A and 13B are diagrams illustrating another example of provision of the contents of the operation information by the AR image. FIG. 13A illustrates a state in which the user stops at the center of the platform 51 and looks toward the depth direction of the platform, and FIG. 13B illustrates the augmented-reality scenery that the user is visually recognizing.

In the case of FIGS. 13A and 13B, the direction of the user's line of sight is parallel to the platform, and it is unclear in which direction the train will be taken, only by the image analysis.

Therefore, in the example of FIGS. 13A and 13B, both the operation information about the train heading for the direction of Yokohama and the operation information about the train heading for the direction of Shinagawa are displayed as the AR image so as to be more conspicuous according to the height at which the electric bulletin board is installed.

Example 2

Here, it is assumed that the contents of an advertisement posted near the entrance of a commercial building are provided as an AR image to the user.

Figure 14A:
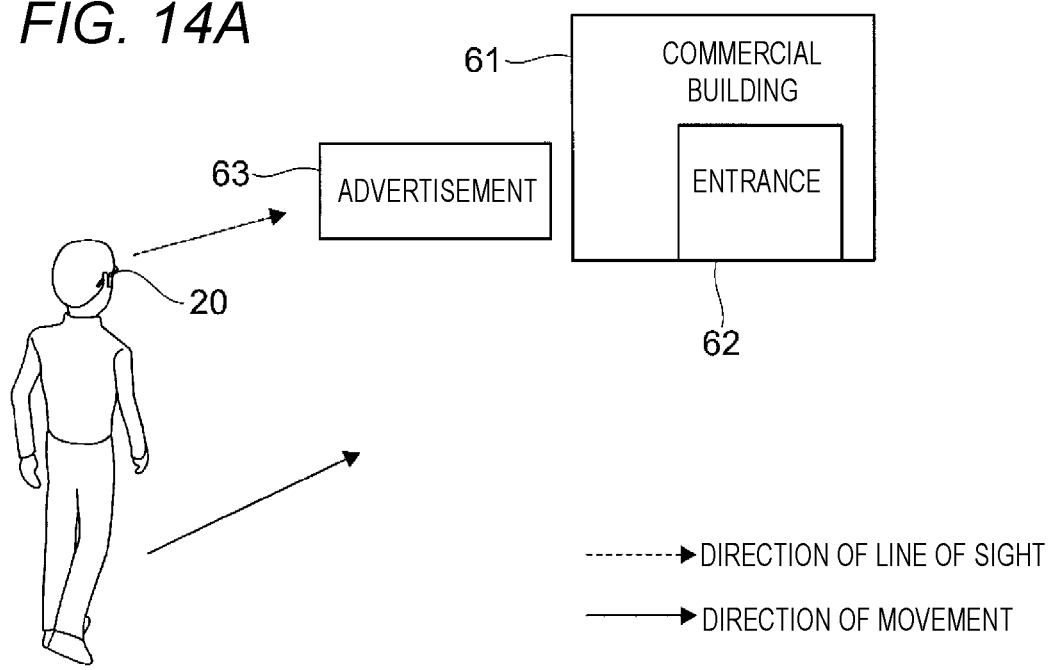
FIGS. 14A to 14C are diagrams illustrating a scene in which a user wearing the xR device 20 heads for a commercial building.
Figure 14B:
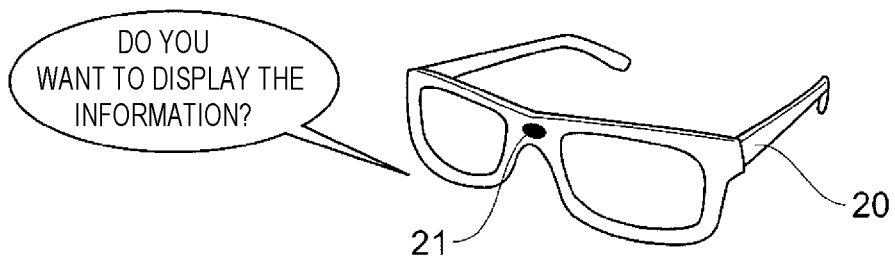
Figure 14C:
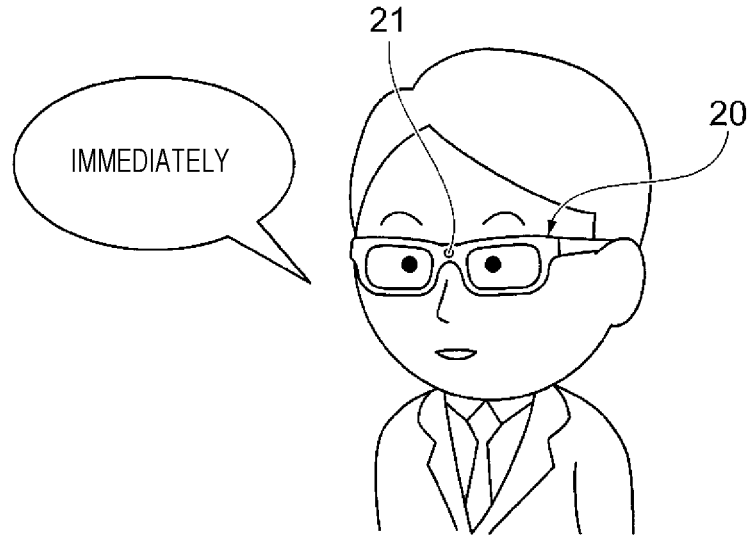

FIGS. 14A to 14C are diagrams illustrating a scene in which the user wearing the xR device 20 heads for a commercial building 61. FIG. 14A illustrates the user heading for the commercial building 61, FIG. 14B illustrates an example of an inquiry from the xR device 20, and FIG. 14C illustrates an example of an instruction from the user.

In the case of FIGS. 14A to 14C, the entrance 62 of the commercial building 61 is located on the right side of the building, and a signboard 63 is arranged side by side on the left side of the building.

Since the user is walking toward the entrance 62, it is difficult to notice the existence of the signboard 63.

The camera 21 of the xR device 20 is capturing an image in front of the user. Therefore, the signboard 63 is reflected on the camera 21 on the way to the entrance 62 of the commercial building 61. In this example, an image obtained by the camera 21 is uploaded to and analyzed by the server 10 (see FIG. 1) at the same time as the image capturing.

When the existence of the signboard 63 is detected as a result of the image analysis, the xR device 20 outputs a voice inquiring the user whether to display the contents of the information, as illustrated in FIG. 14B.

In the example of FIG. 14B, a voice "Do you want to display the information?" is output.

It is also possible to change the expression according to the contents of the information and the number of times the voice is output. In the former, it is possible to predict the contents of the information with a difference in expression. However, when there are too many expressions, it will be difficult to predict the contents of the information. In the latter, it is possible to avoid the contents of the inquiry from becoming monotonous.

In the example of FIG. 14C, unlike the above-described example 1, the user instructs "immediately".

Figure 15:
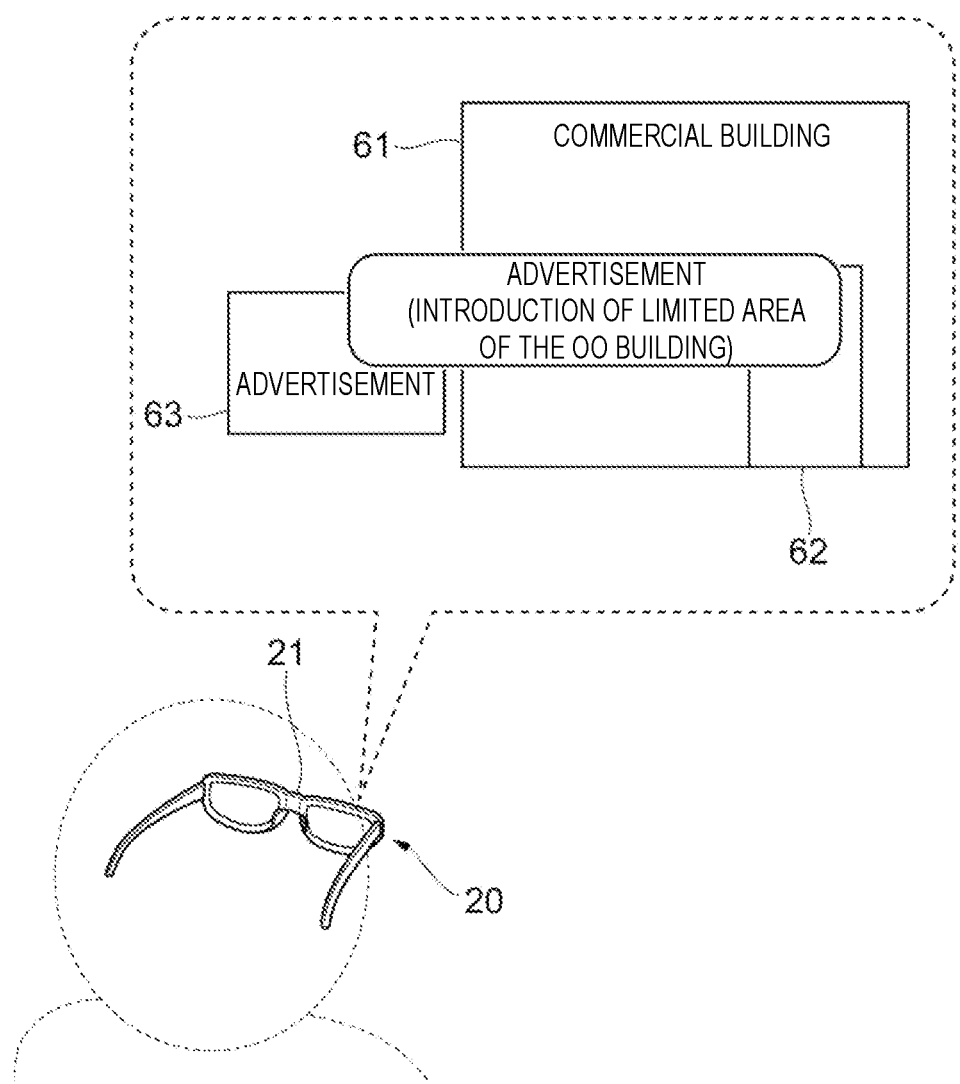
FIG. 15 is a diagram illustrating an example of provision of the contents of an advertisement by an AR image.

FIG. 15 is a diagram illustrating an example of provision of the contents of an advertisement by an AR image. In FIG. 15, portions corresponding to those in FIGS. 14A to 14C are denoted by the corresponding reference numerals.

The xR device 20 that receives an instruction "immediately" acquires an AR image, which is generated by the image analysis, from the server 10 (see FIG. 1) and displays the AR image in front of the user.

In this example, even when a distance between the user and the signboard 63 is long and the contents described on the signboard 63 is unknown, the user may be made aware of the contents of the advertisement.

Figure 16:
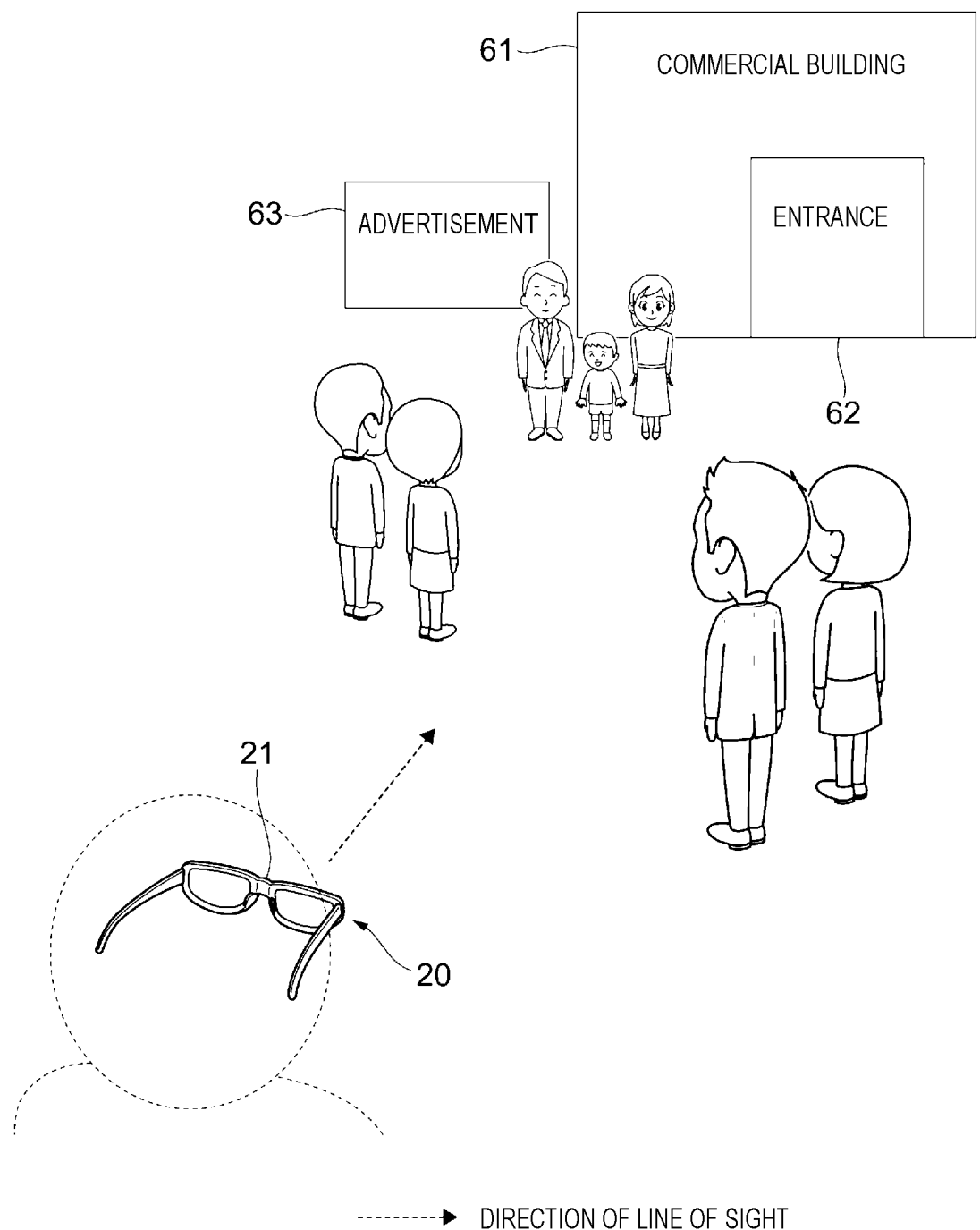
FIG. 16 is a diagram illustrating a case where the display of the contents of information is permitted, but an AR image is not displayed because the surroundings of a user are crowded.

FIG. 16 is a diagram illustrating a case where the display of the contents of the information is permitted, but the AR image is not displayed because the surroundings of the user are crowded. In FIG. 16, portions corresponding to those in FIG. 15 are denoted by the corresponding reference numerals.

In the example of FIG. 15, there is only the commercial building 61 in the direction of the user's line of sight, and there is no other passerby. However, in the example of FIG. 16, another passerby is in the direction of the user's line of sight.

For example, when "when the surroundings are not crowded" is set by the user as the condition for displaying the AR image (see FIG. 4), the xR device 20 does not display the contents of the signboard 63 as an AR image, but an AR image is displayed at the point of time when another timing set by the user arrives, in step 11 (see FIG. 7).

Example 3

Here, a modification to example 1 or example 2 will be described.

Figure 17A:
FIGS. 17A and 17B are diagrams illustrating an example of provision of information.
Figure 17B:
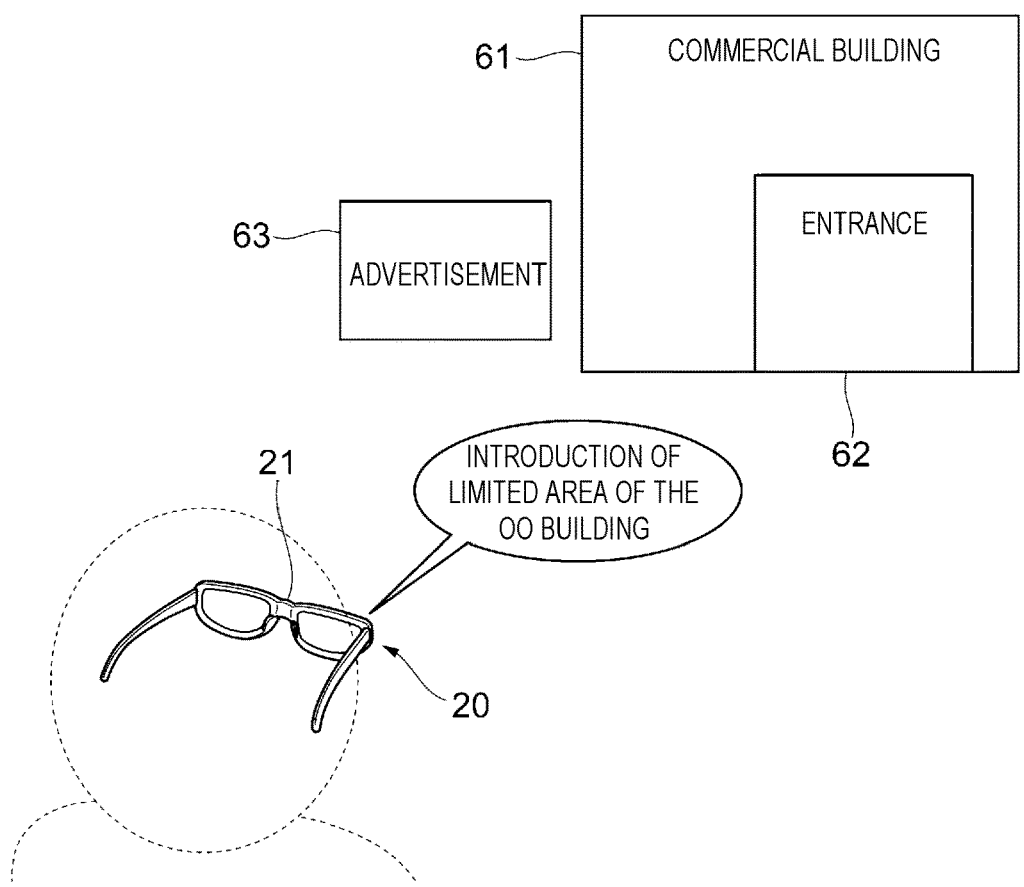

FIGS. 17A and 17B are diagrams illustrating an example of provision of information. FIG. 17A is an example of a user's instruction for an inquiry, and FIG. 17B is an example of provision of the contents of information by a voice.

In the case of FIG. 17A, the user's instruction is given by a voice. The user in this example is instructing "immediately by a voice" for an inquiry from the xR device 20.

As a result, in the example of FIG. 17B, immediately after receiving the instruction from the user, a voice "introduction of the limited area of the OO building" is output from the speaker 240 (see FIG. 5) of the xR device 20.

This instruction corresponds to a case where the affirmative result is obtained in step 23 (see FIG. 8).

In this example, since the method of providing the contents of the information to the user by the voice is adopted, the user's field of view is not obstructed by the AR image. Therefore, even when there are other passersby around the user, the user may know the contents of the signboard 63 posted on the commercial building 61 in the direction of the light of sight.

Figure 18A:
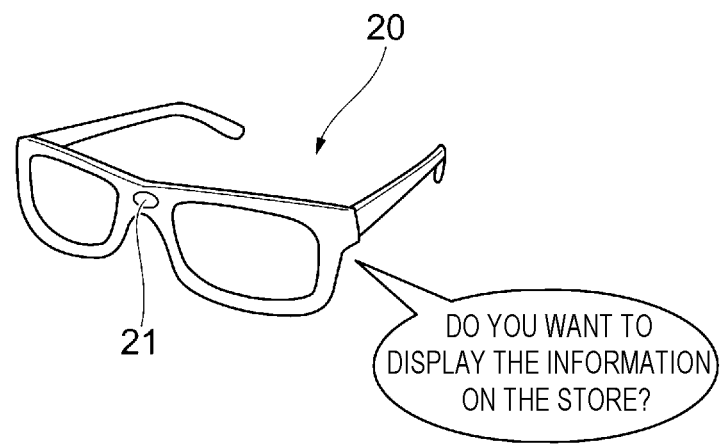
FIGS. 18A and 18B are diagrams illustrating another example of the inquiry and the instruction.
Figure 18B:
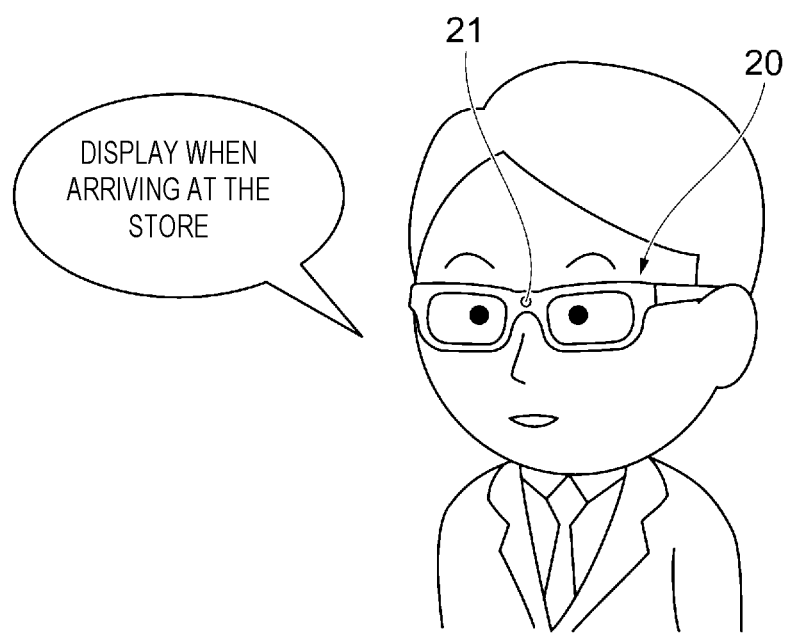

FIGS. 18A and 18B are diagrams illustrating another example of the inquiry and the instruction. FIG. 18A illustrates an example of the inquiry from the xR device 20, and FIG. 18B illustrates an example of the instruction from the user.

In the example of FIG. 18A, unlike the other examples described above, the target of information is included in the inquiry. That is, like "Do you want to display the information on the store?", "on the store" is added after "Do you want to display the information?". Therefore, the user may guess the target of the information although the user does not know the contents of the information.

In addition to "on the store", a station or other places may be added, or the contents suggesting the type of information such as "traffic" and "regulation" may be added.

In any case, at the inquiry stage, the burden on the user is reduced by simplifying the contents as much as possible.

This is because when the contents of the inquiry are detailed, it is no difference from providing the content of the information. At the inquiry stage, it is sufficient to inform the existence of information that may be provided. In that sense, the inquiry may be "display information?" or "display?".

The user in FIG. 18B gives an instruction to "display when arriving at the store". Other examples of instructions include "at 3 o'clock", "after 30 minutes", and "when returning home".

Example 4

Here, a case where plural pieces of information exist in the image captured by the camera 21 (see FIG. 1) will be described.

Figure 19A:
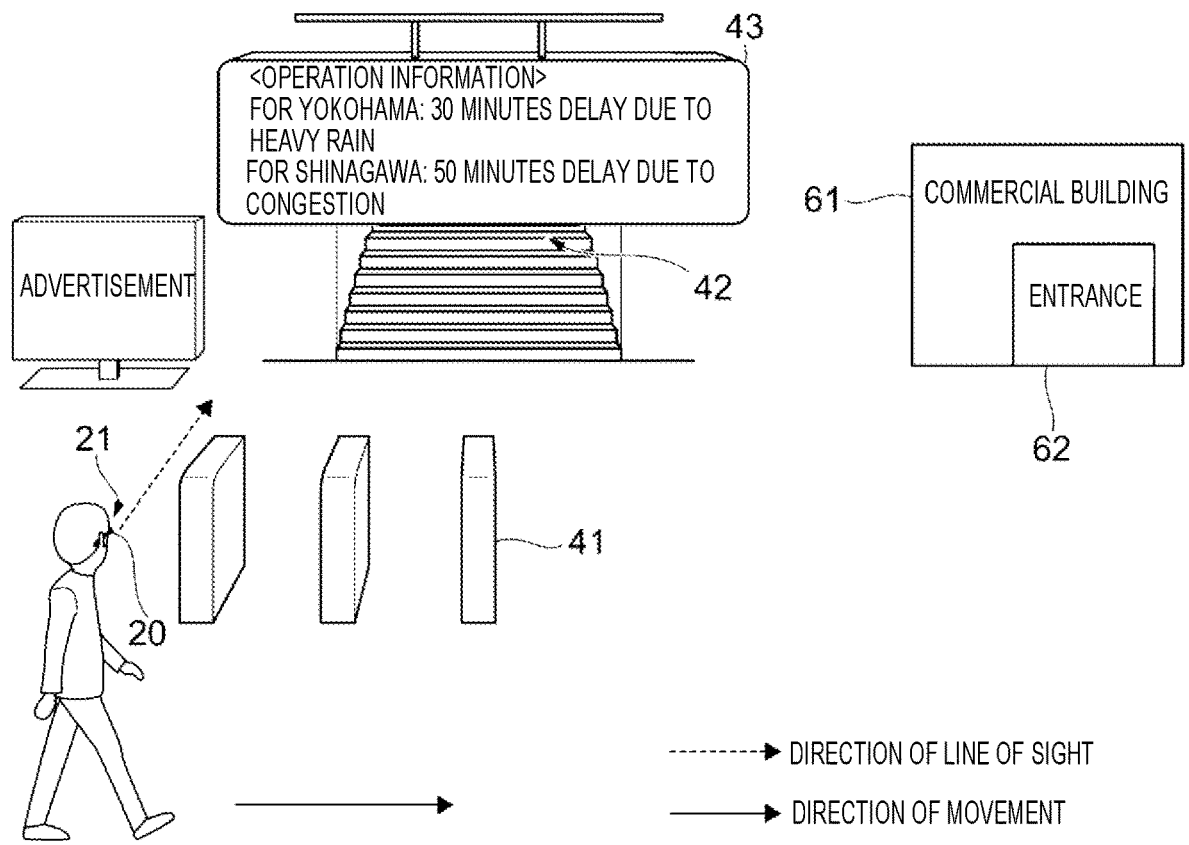
FIGS. 19A and 19B are diagrams illustrating a case where the existence of information is detected on the way to shopping.
Figure 19B:
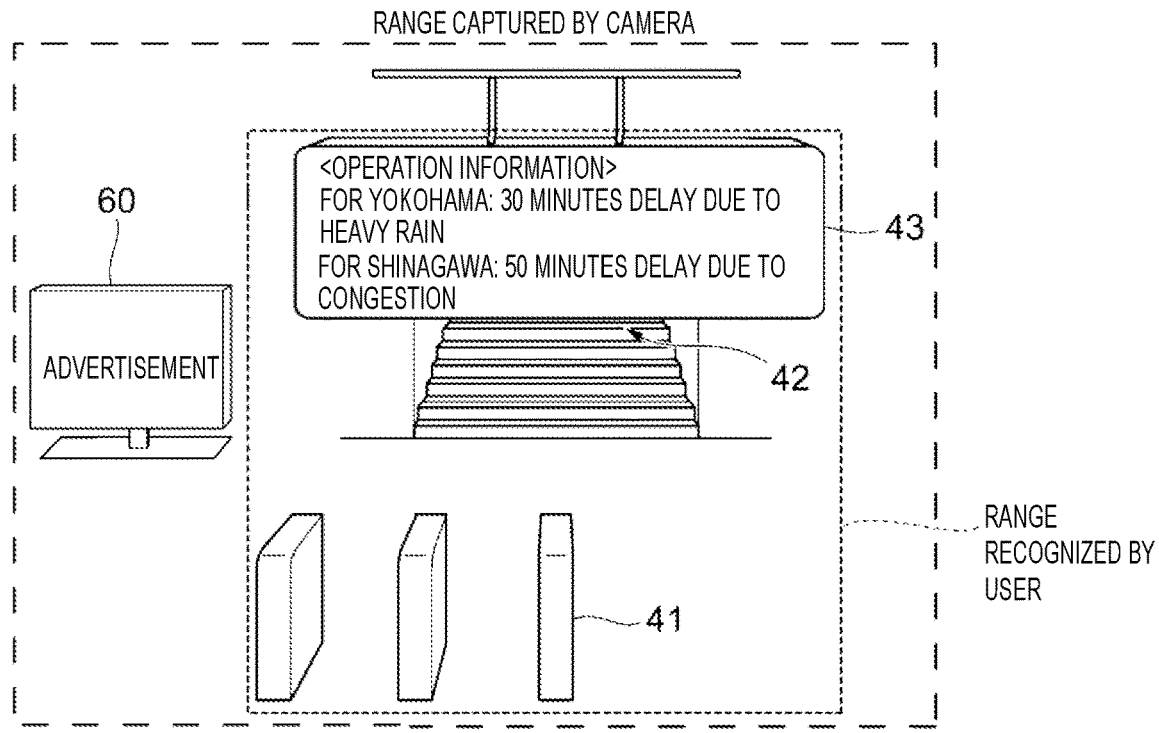

FIGS. 19A and 19B are diagrams illustrating a case where the existence of information is detected on the way to shopping. FIG. 19A illustrates a state in which the face of the user is turned toward a station on the way to a commercial building, and FIG. 19B illustrate a difference between a range captured by the camera 21 and a range recognized by the user.

In the case of FIG. 19A, the user is moving from the left side to the right side. There is a commercial building on the right side in the direction of movement, which is the user's destination. The destination may or may not be registered in the inquiry target table 112 in advance.

The face of the user in FIG. 19A is turned toward the ticket gate of the station while passing in front of the station.

In FIG. 19B, the range captured by the camera 21 is indicated by a thick broken line, and the range recognized by the user is indicated by a thin broken line. The user's field of view is said to be 100° on each side, but the clearly recognizable range (that is, the effective field of view) is called 4° to 20°. In that sense, the range captured by the camera 21 may be wider than the effective field of view, and does not necessarily have to be equal to or larger than the viewing angle of a person.

When looking sideways in the direction of the station while walking, even when the electric bulletin board 43 and the signboard 63 are included in the user's field of view, the characters and the like are not read unless the user closely looks at them. Therefore, the operation information and the contents of advertisement are not noticed.

Meanwhile, the range captured by the camera 21 includes the electric bulletin board 43 and the signboard 63, and the characters are also captured as an image. The captured image is uploaded from the xR device 20 to the server 10 (see FIG. 1) where the image is analyzed.

As a result of the image analysis, the existence of the operation information and the existence of the advertisement are detected. After that, the xR device 20 outputs an inquiry to the user as to whether to display the contents of information.

Figure 20A:
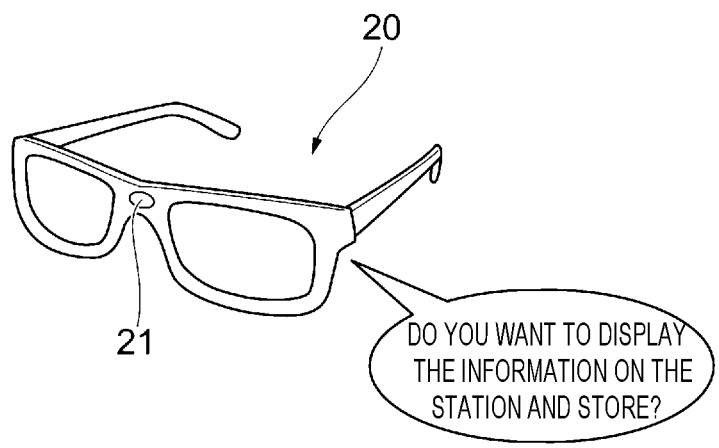
FIGS. 20A and 20B are diagrams illustrating a state of an output of an inquiry from an xR device and an instruction from a user.
Figure 20B:

FIGS. 20A and 20B are diagrams illustrating a state of an output of an inquiry from the xR device 20 and an instruction from the user. FIG. 20A illustrates an example of an inquiry from the xR device 20, and FIG. 20B illustrates an example of a case where display is permitted with a designated timing.

In the case of FIG. 20A, the target of information is included in the inquiry. In the example of FIG. 20A, "Do you want to display the station and store information?" is output.

Therefore, the user will be aware of the existence of a station and store information.

In the case of FIG. 20B, since the user is walking, the user is instructing of "display when arriving at the store".

Figure 21A:
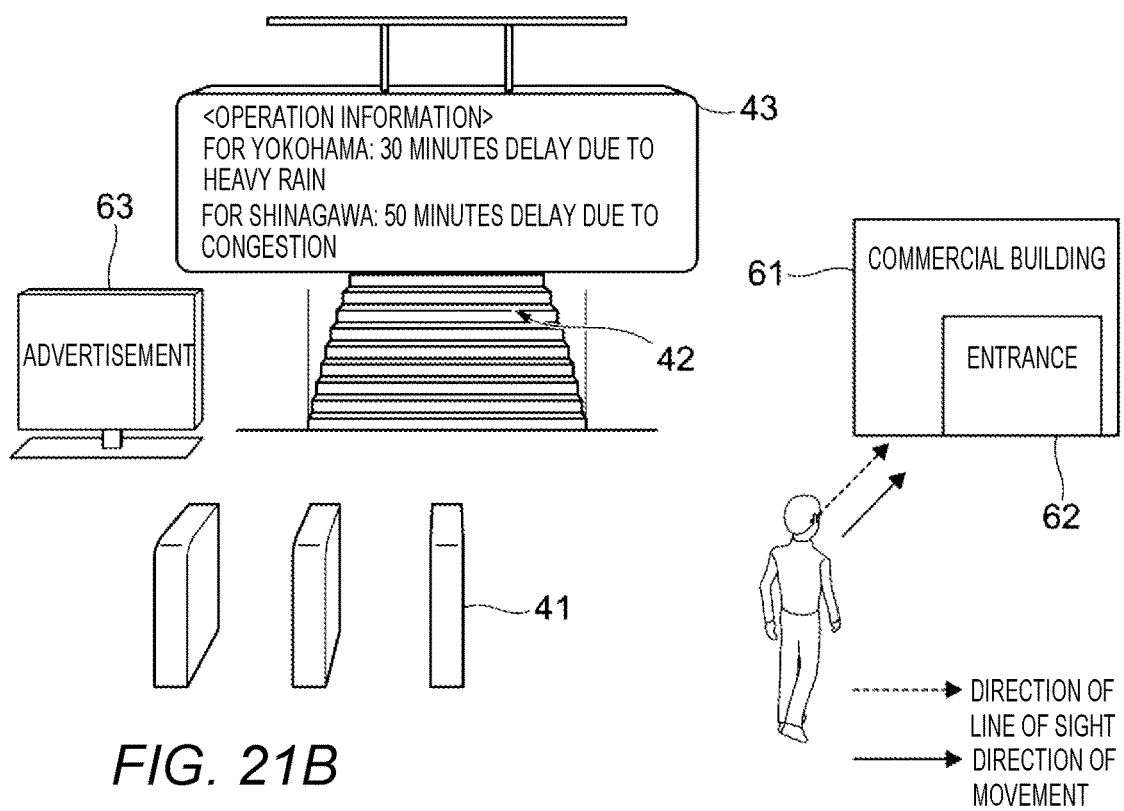
FIGS. 21A and 21B are diagrams illustrating an example of presentation of information when a user approaches a destination.
Figure 21B:
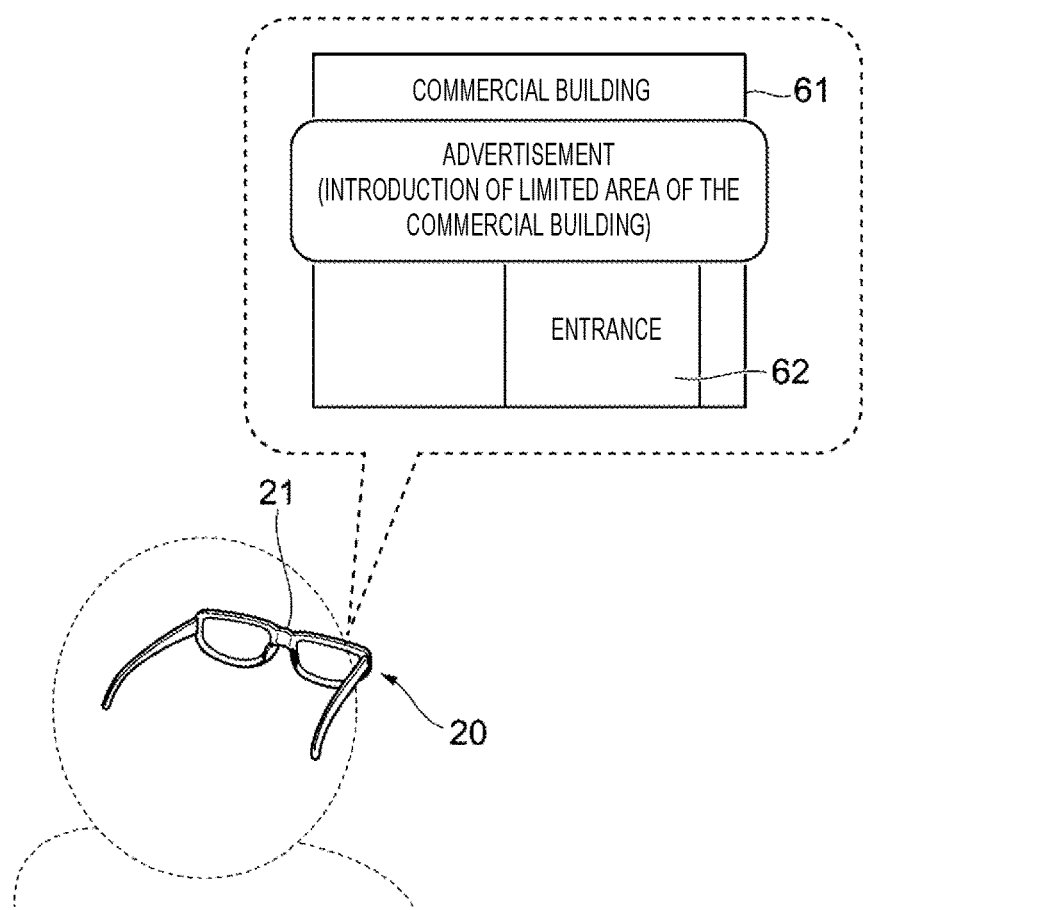

FIGS. 21A and 21B are diagrams illustrating an example of presentation of information when the user approaches a destination. FIG. 21A illustrates the user walking toward the entrance 62 of the commercial building 61 which is the destination, and FIG. 21B illustrates an example of presentation of the contents of information.

As illustrated in FIG. 21A, the user who has passed in front of the station is walking toward the entrance 62 of the commercial building 61, which is the destination. At this time, as illustrated in FIG. 21B, an advertisement text, which is the contents of the detected information, is displayed as an AR image in front of the user's line of sight. The user who sees this display will know in advance the advertisement regarding the commercial building 61 that the user is about to enter.

Second Exemplary Embodiment

In the second exemplary embodiment, an example in which a gesture is used for an instruction will be described.

Figure 22A:
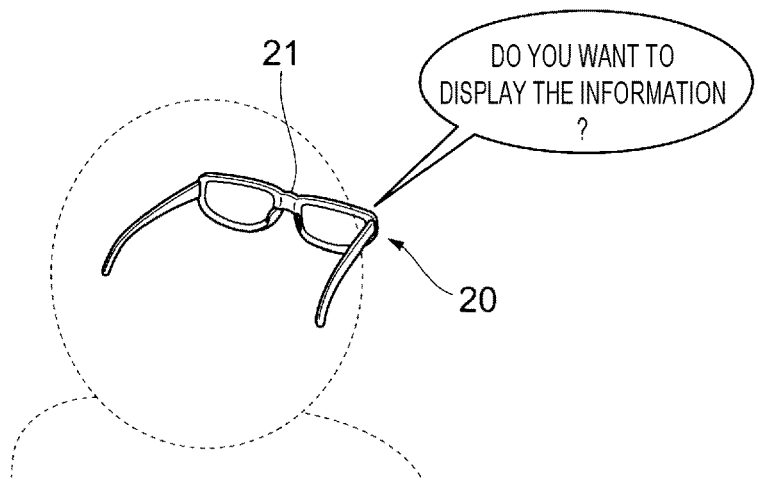
FIGS. 22A to 22C are diagrams illustrating an example of instructing display of the contents of information by the number of fingers.
Figure 22B:
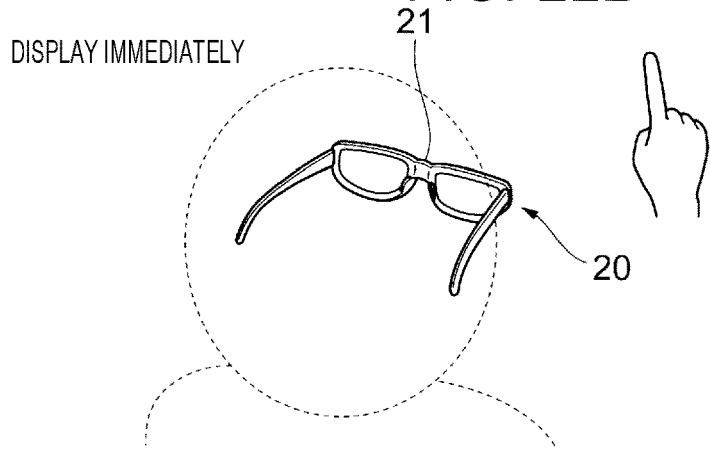
Figure 22C:
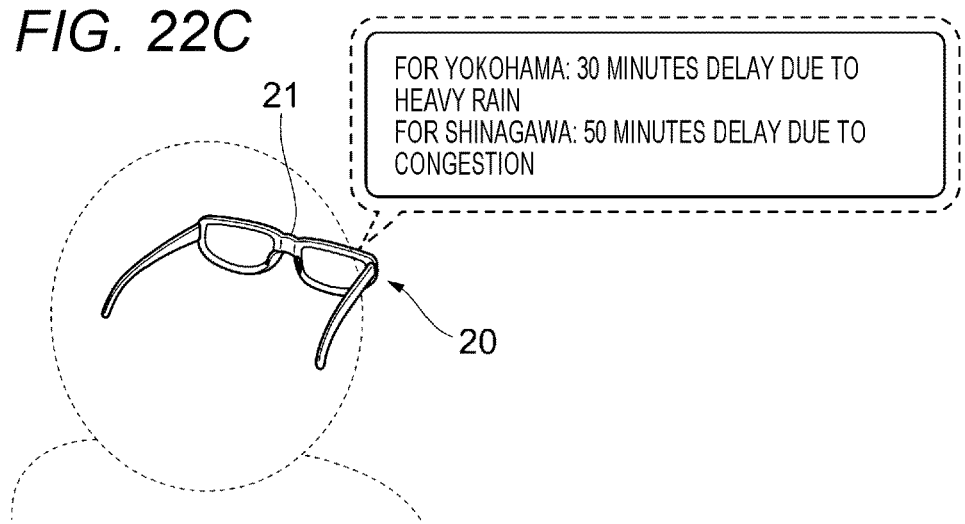

FIGS. 22A to 22C are diagrams illustrating an example of instructing display of the contents of information by the number of fingers. FIG. 22A illustrates an example of an inquiry from the xR device 20, FIG. 22B illustrates an example of instructing "display immediately" by a gesture, and FIG. 22C illustrates an example of displaying the contents of information by an AR image.

In FIG. 22A, an inquiry is output by voice from the xR device 20. In FIG. 22B, the user is pointing his/her index finger up. In this example, the number of fingers is one.

One finger is allocated to the instruction to "display immediately". Since the number of fingers may be one, the finger to be used does not have to be the index finger. For example, the finger may be a thumb or a little finger.

Further, in this example, the direction of the finger has no meaning, and the direction of the fingertip may be leftward or downward. The number of fingers is detected by analysis of an image captured by the camera 21.

In FIG. 22C, the operation information "For Yokohama: 30 minutes delay due to heavy rain" and "For Shinagawa: 50 minutes delay due to the influence of congestion" are displayed.

Figure 23A:
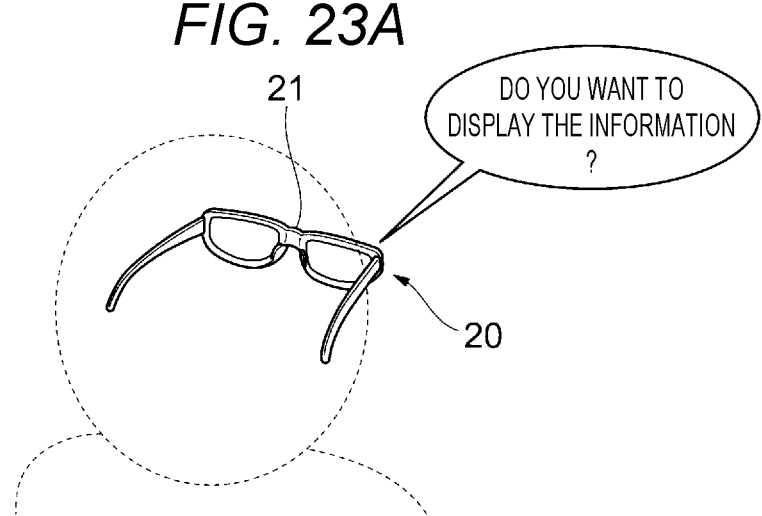
FIGS. 23A to 23C are diagrams illustrating another example of instructing the display of the contents of information by the number of fingers.
Figure 23B:
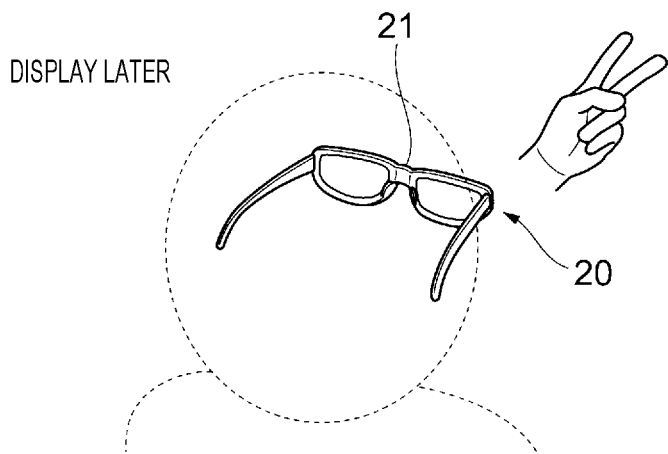
Figure 23C:
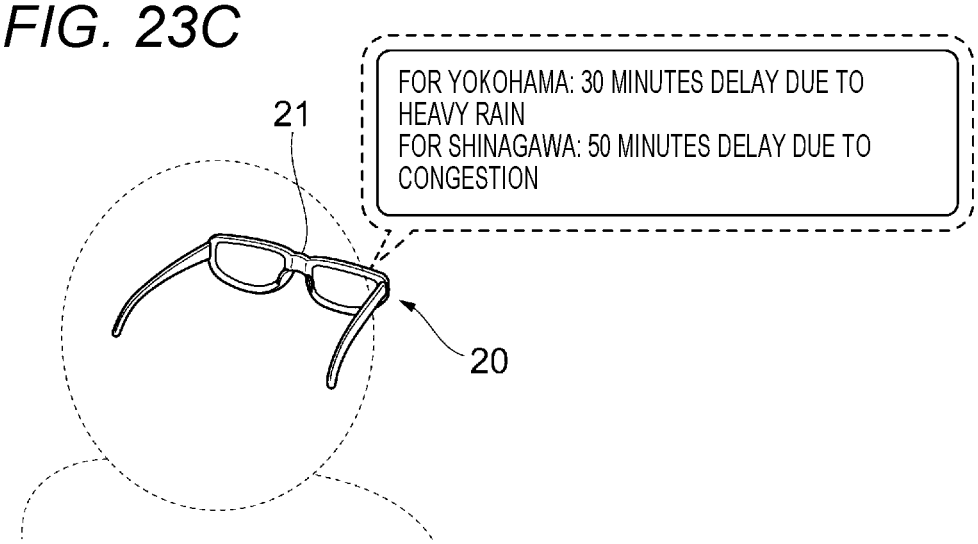

FIGS. 23A to 23C are diagrams illustrating another example of instructing the display of the contents of information by the number of fingers. FIG. 23A illustrates an example of an inquiry from the xR device 20, FIG. 23B illustrates an example of instructing "display later" by a gesture, and FIG. 23C illustrates an example of displaying the contents of information by an AR image.

In the case of FIG. 23A, the inquiry is output by a voice from the xR device 20. In FIG. 23B, the user makes a V shape with the index finger and the middle finger. In this case, the number of fingers is two. The combination of fingers used to display the two fingers is not limited to the index finger and the middle finger. For example, the thumb and the index finger may be used.

In the example of FIG. 23B, two fingers are allocated to an instruction of "later". Therefore, an instruction to display with a time lag is given by holding the two fingers in front of the camera 21.

In the case of FIG. 23C, the contents of information are displayed at the timing registered in the provision timing table 113 (see FIG. 4). For example, at the timing of arrival at the destination, the operation information "For Yokohama: 30 minutes delay due to heavy rain" and "For Shinagawa: 50 minutes delay due to the influence of congestion" are displayed.

Figure 24A:
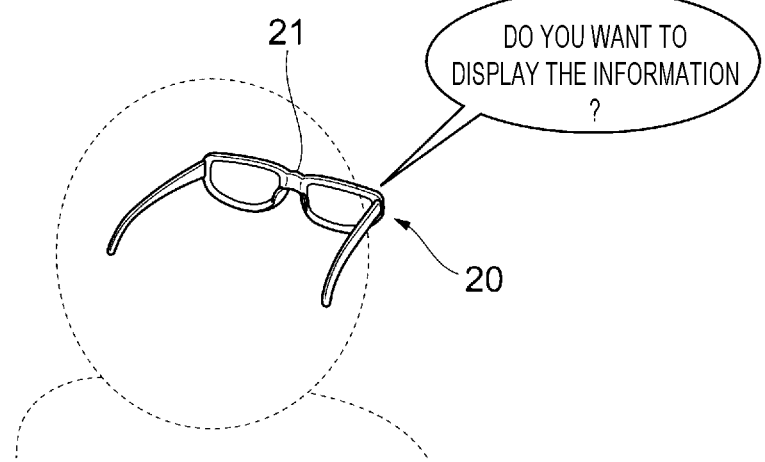
FIGS. 24A to 24C are diagrams illustrating another example of instructing the display of the contents of information by the number of fingers.
Figure 24B:
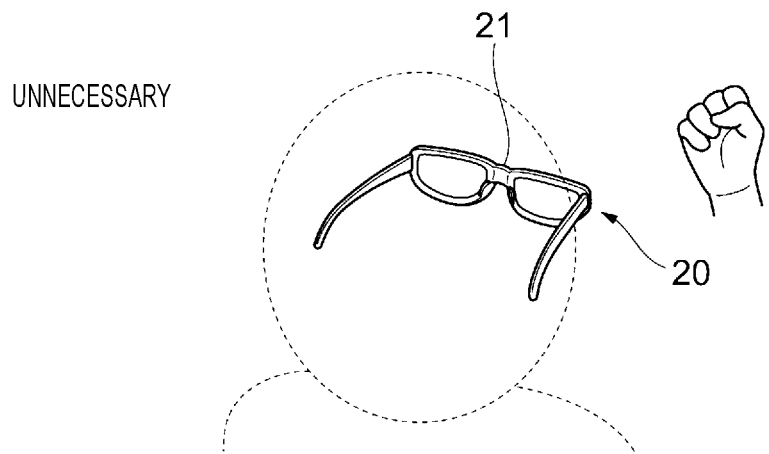
Figure 24C:
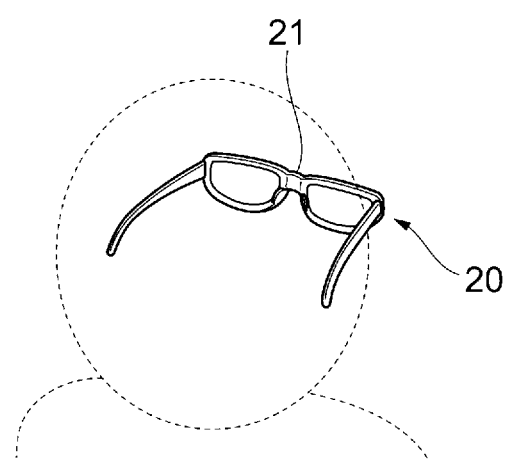

FIGS. 24A to 24C are diagrams illustrating another example of instructing the display of the contents of information by the number of fingers. FIG. 24A illustrates an example of an inquiry from the xR device 20, FIG. 24B illustrates an example of instructing "unnecessary" by a gesture, and FIG. 24C illustrates an example in which the contents of information are not displayed.

In the case of FIG. 24A, the inquiry is output by a voice from the xR device 20. In FIG. 24B, the user is making a fist. In this case, the number of fingers is zero. In the case of FIG. 24B, zero finger is allocated to an instruction of "unnecessary". Even when a state without gesture continues for a predetermined time or longer, it is considered as "unnecessary".

Since it is unnecessary, an AR image is not displayed in front of the user's line of sight in FIG. 24C.

The instruction for the inquiry is not limited to the number of fingers.

For example, the direction of the finger may be used for the instruction. For example, when the fingertip points to the left, it means "display immediately". When the fingertip points up, it means "display later". When the fingertip points down, it means "unnecessary".

In addition, the movement of fingers or a hand may be used as an instruction. For example, when a finger or a hand is raised up, it means "display immediately". When a finger or a hand sticks forward, it means "display later". When the hand is moved left or right, it means "unnecessary". Further, the action of holding the hand or the action of spreading the hand may be used for the instruction, or the number of times of repeating the action of holding the hand and the action of spreading the hand may be used for the instruction.

In addition, the motion of fingers or a hand may be combined with the speed of the motion of fingers or a hand. For example, when a finger or a hand is raised quickly, it may mean "display immediately". When a finger or a hand is raised slowly, it may mean "display later".

Moreover, a shape made by fingers may be used for the instruction. For example, "display immediately" may be allocated to a ring shape, and "display later" may be allocated to a C-shaped shape.

Further, the right hand may be used for "display immediately", and the left hand may be used for "display later". Surely, the allocation of the instruction may be reversed left and right.

Moreover, both the right hand and the left hand may be used for the instruction. For example, when the user makes a circle shape with both hands, it may mean "display immediately". When the user makes a heart shape with both hands, it may mean "display later".

Third Exemplary Embodiment

In a third exemplary embodiment, an example in which a button provided on the xR device 20 is used as an instruction will be described.

Figure 25A:
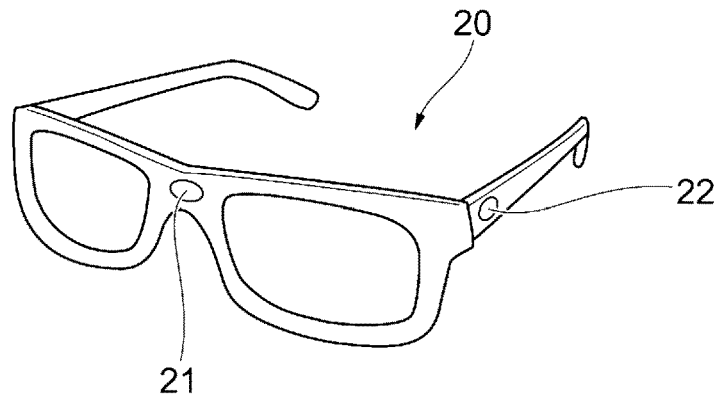
FIGS. 25A to 25C are diagrams illustrating the relationship between an operation of a button provided on an xR device and an instruction.
Figure 25B:
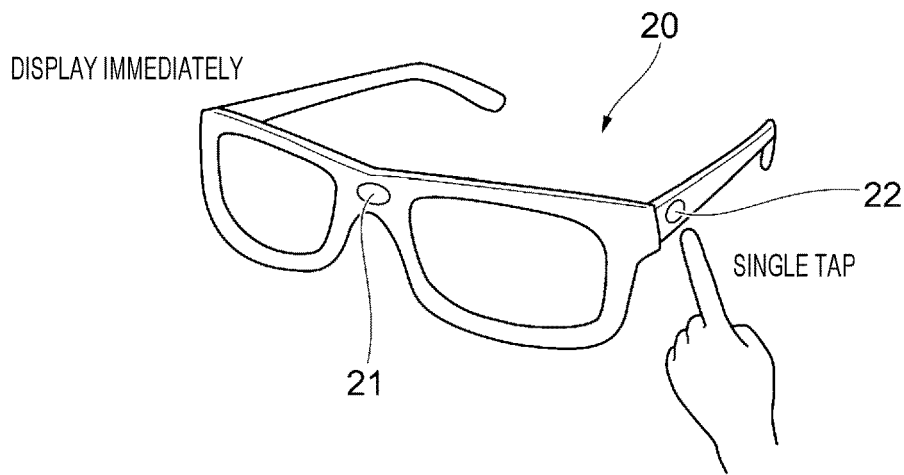
Figure 25C:
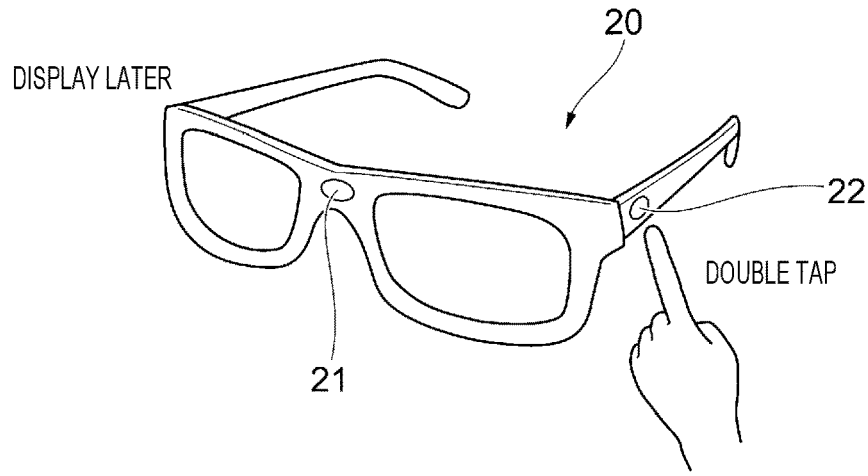

FIGS. 25A to 25C are diagrams illustrating the relationship between an operation of the button provided on the xR device 20 and an instruction. FIG. 25A illustrates the xR device 20 with the button, FIG. 25B illustrates an example of instructing "display immediately", and FIG. 25C illustrates an example of instructing "display later".

In the xR device 20 illustrated in FIG. 25A, the button 22 is arranged at a temple portion. The button 22 may be a mechanical button or a sensor that detects a contact.

"Display immediately" is allocated to a single tap of the button 22 illustrated in FIG. 25B, and "display later" is allocated to a double tap of the button 22 illustrated in FIG. 25C.

Surely, the number of taps and the allocation of instruction contents are examples. Further, when the sensor that detects a contact is used, the length of time during which a finger is in contact may be allocated to the instruction contents. For example, when the contact time is less than 1 second, it is regarded as "display immediately". When the contact time is 1 second or more, it is regarded as "display later".

The instruction using the button 22 is very suitable when there are many people around and an instruction by a voice or a gesture is not suitable.

Fourth Exemplary Embodiment

In a fourth exemplary embodiment, an example of using an AR image for an inquiry will be described.

Figure 26A:
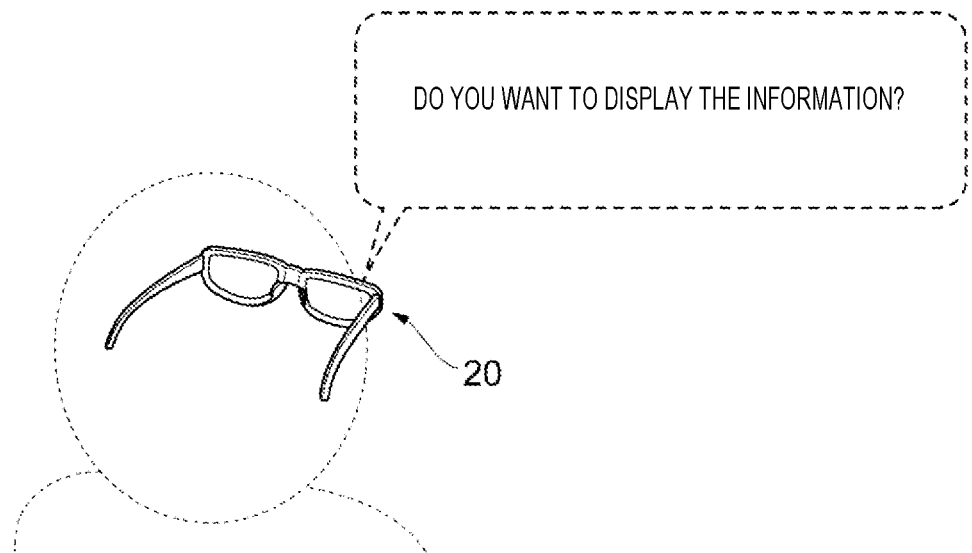
FIGS. 26A and 26B are diagrams illustrating an example of an inquiry by an AR image.
Figure 26B:
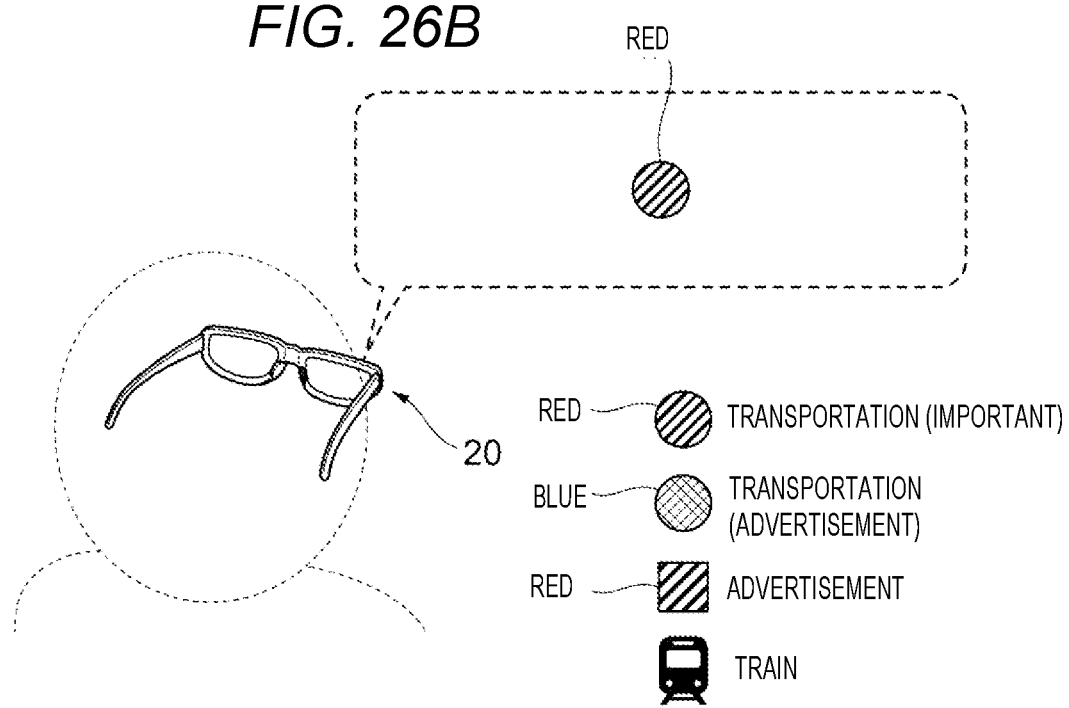

FIGS. 26A and 26B are diagrams illustrating an example of an inquiry by an AR image. FIG. 26A is an example of using a text for an inquiry, and FIG. 26B is an example of using a mark for an inquiry.

In the case of FIG. 26A, a short sentence for the inquiry is displayed as the AR image. In this case, the text is displayed in front of the user's line of sight, but the length of the text used for the inquiry is prepared to be shorter than when displaying the contents of information. The inquiry by the short sentence does not obstruct the user's field of view. The AR image displaying this text is an example of a second augmented-reality image.

In the case of FIG. 26B, since the mark is used for the inquiry, it is unlikely to obstruct the user's field of view.

In the example of FIG. 26B, the contents of information are suggested by the color and shape of the mark. For example, a red circular mark means information on a transportation with a high degree of importance, and a blue circular mark means an advertisement of a transportation. In addition, a red square mark means an advertisement.

FIG. 26B also exemplifies a case where an icon is used as the mark. The example of FIG. 26B is a train-shaped icon, which indicates that the information on a transportation exists.

The user who confirms these marks gives an instruction as to whether to permit display. An AR image displaying the mark here is also an example of a second augmented-reality image.

In the example of FIG. 26B, the mark corresponding to the contents of information is used, but a mark that simply delivers the existence of information for which permission of display is requested may be used.

Further, in FIG. 26B, the shape and icon are illustrated as examples of the mark, but a symbol, a sign, and a stamp may be used.

Further, when displaying the inquiry as an AR image, the inquiry may be displayed avoiding the center of the field of view. Since the user's interest is unknown at the inquiry stage, the inquiry is displayed around the field of view so as not to obstruct the user's field of view. However, as the inquiry is closer to the periphery of the field of view, it becomes harder to notice. Thus, it is also possible to place it in the center of the field of view. When the AR image is used for the inquiry, it is desirable that the user designates a position at which the AR image is to be displayed, in advance.

Fifth Exemplary Embodiment

Figure 27:
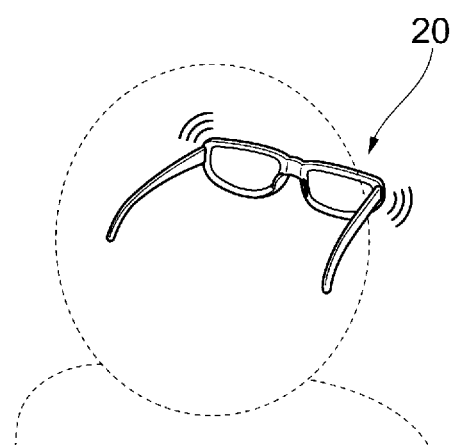
FIG. 27 is a diagram illustrating an example of using vibration for an inquiry.

FIG. 27 is a diagram illustrating an example of using vibration for an inquiry.

The xR device 20 used in a fifth exemplary embodiment vibrates the vibrator 270 (see FIG. 5) when inquiring about display of the contents of information.

The xR device 20 used in the present exemplary embodiment notifies the user, with vibration, that the information registered in the inquiry target table 112 has been detected (see FIG. 3).

The type of vibration may be changed according to the contents of information. For example, for the operation information on a transportation, a single vibration may be used, and for an advertisement, a double vibration may be used. Further, a pattern of vibration defined by the strength and length of the vibration may be changed.

In FIG. 27, the vibrator 270 provided in the xR device 20 is vibrated to inquire the user whether to display the contents of information. However, the vibrator 270 may be a device independent of the xR device 20. For example, the vibrator 270 may be a device that is put in a pocket for use. In this case, the vibrator 270 and the xR device 20 are connected by Bluetooth or the like.

Sixth Exemplary Embodiment

Figure 28:
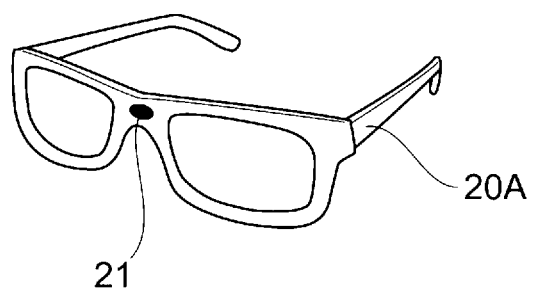
FIG. 28 is a diagram illustrating an example of the appearance of an xR device used in a sixth exemplary embodiment.

FIG. 28 is a diagram illustrating an example of the appearance of an xR device 20A used in a sixth exemplary embodiment. In FIG. 28, portions corresponding to those in FIG. 1 are denoted by the corresponding reference numerals.

The xR device 20A used in the present exemplary embodiment is provided with the function of the server 10 (see FIG. 1). That is, the xR device 20A alone executes the function of the above-described exemplary embodiment.

Figure 29:
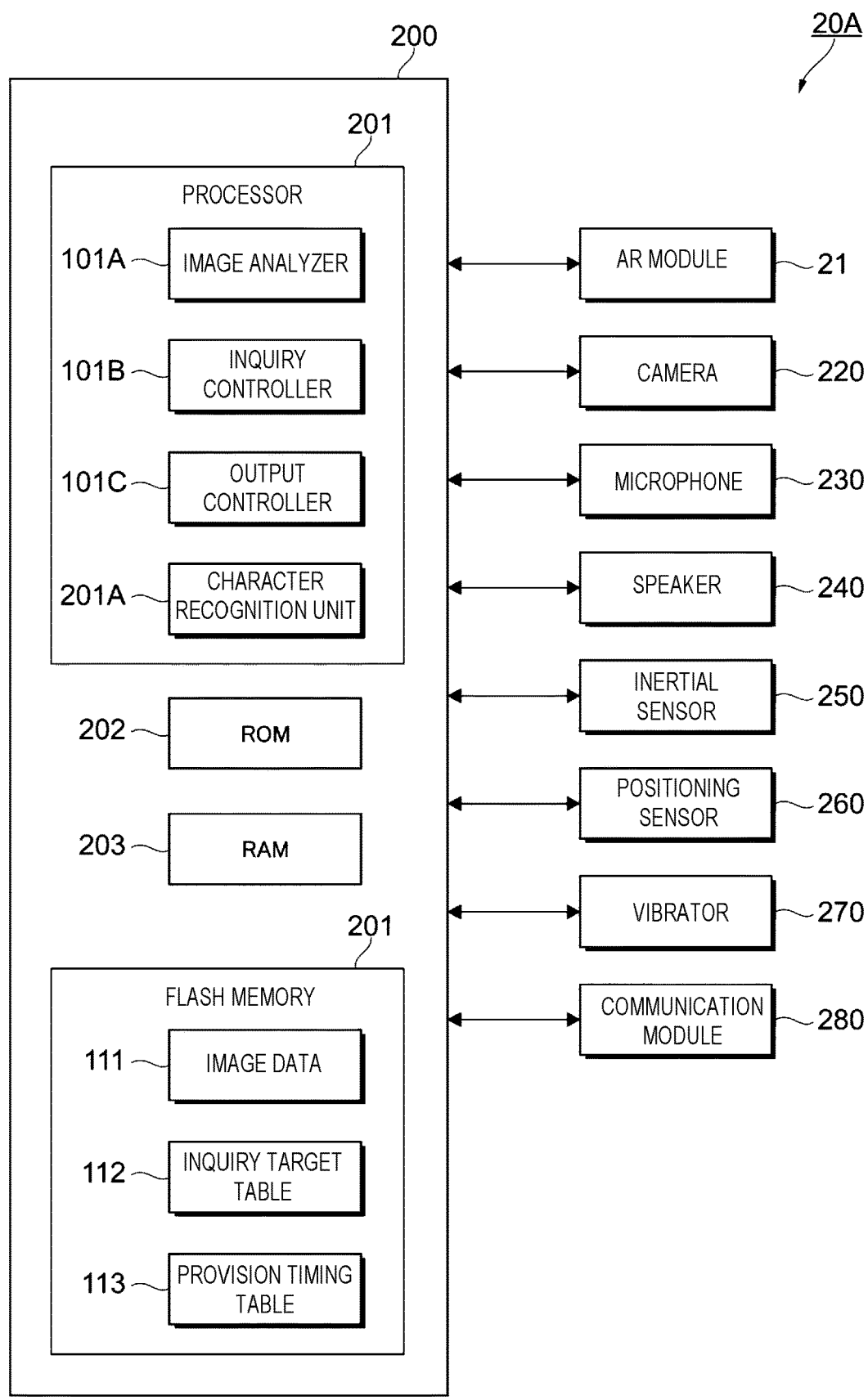
FIG. 29 is a diagram illustrating an example of the hardware configuration of the xR device used in the sixth exemplary embodiment.

FIG. 29 is a diagram illustrating an example of the hardware configuration of the xR device 20A used in the sixth exemplary embodiment. In FIG. 29, portions corresponding to those in FIGS. 2 and 5 are denoted by the corresponding reference numerals.

A processor 201 illustrated in FIG. 29 functions as the image analyzer 101A, the inquiry controller 101B, the output controller 101C, and the character recognition unit 201A.

The image data 111, the inquiry target table 112, and the provision timing table 113 are stored in the flash memory 204.

The xR device 20A used in the present exemplary embodiment alone executes detection, inquiry, and output timing control of information to be displayed as an AR image. Therefore, the xR device 20A may provide a service even when communication with the server 10 is disconnected.

The xR device 20A in the present exemplary embodiment is an example of an information processing apparatus.

Seventh Exemplary Embodiment

Figure 30:
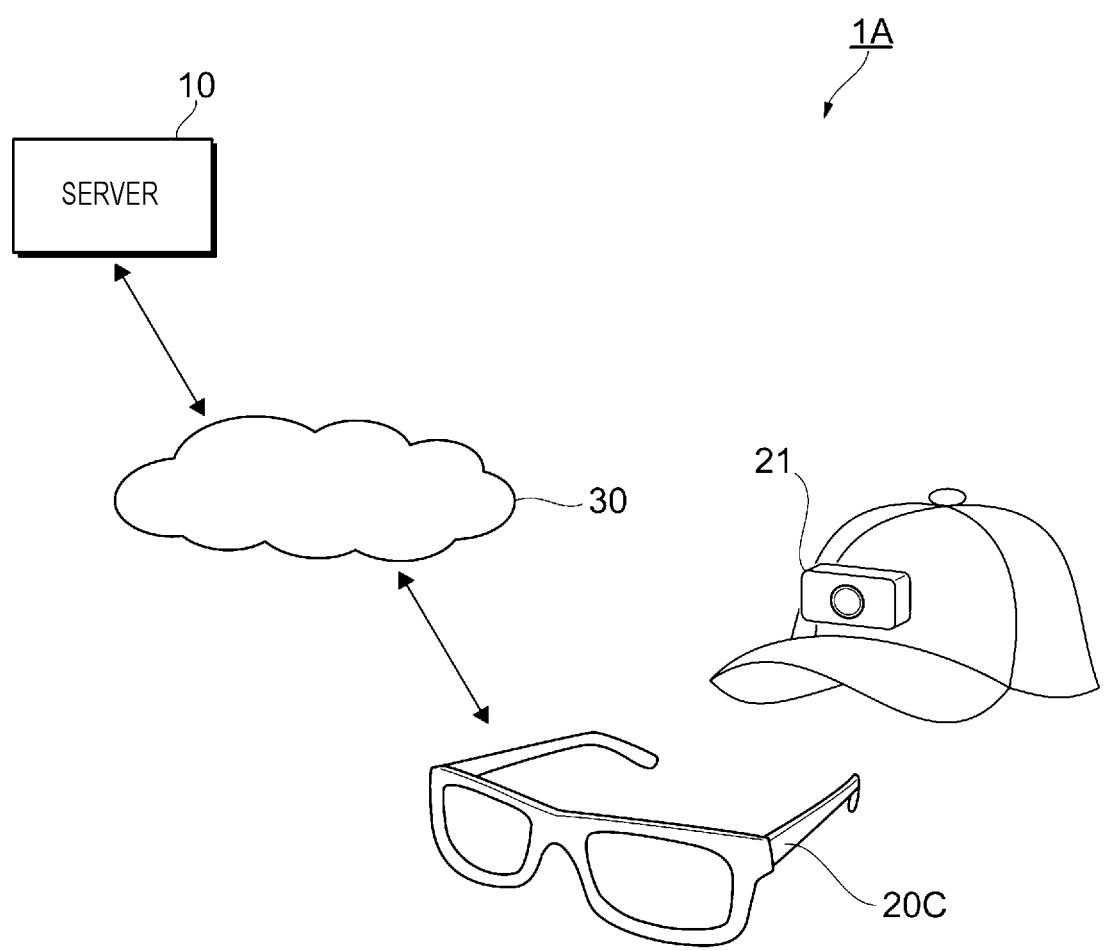
FIG. 30 is a diagram illustrating a usage example of an information processing system used in a seventh exemplary embodiment.

FIG. 30 is a diagram illustrating a usage example of an information processing system 1A used in a seventh exemplary embodiment. In FIG. 30, portions corresponding to those in FIG. 1 are denoted by the corresponding reference numerals.

An xR device 20C used in FIG. 30 is different from the xR device 20 of the first exemplary embodiment (see FIG. 1) in that the camera 21 is not integrally attached to the xR device 20C.

In the seventh exemplary embodiment, the camera 21 is, for example, removable and is attached to a user's clothing or hat. However, a direction in which the camera 21 captures an image is aligned with the direction of the user's line of sight.

The camera 21 is wirelessly connected to the xR device 20C. For example, the camera 21 is connected to the xR device 20C by Bluetooth.

The xR device 20C here is also called a smart glass.

Eighth Exemplary Embodiment

Figure 31:
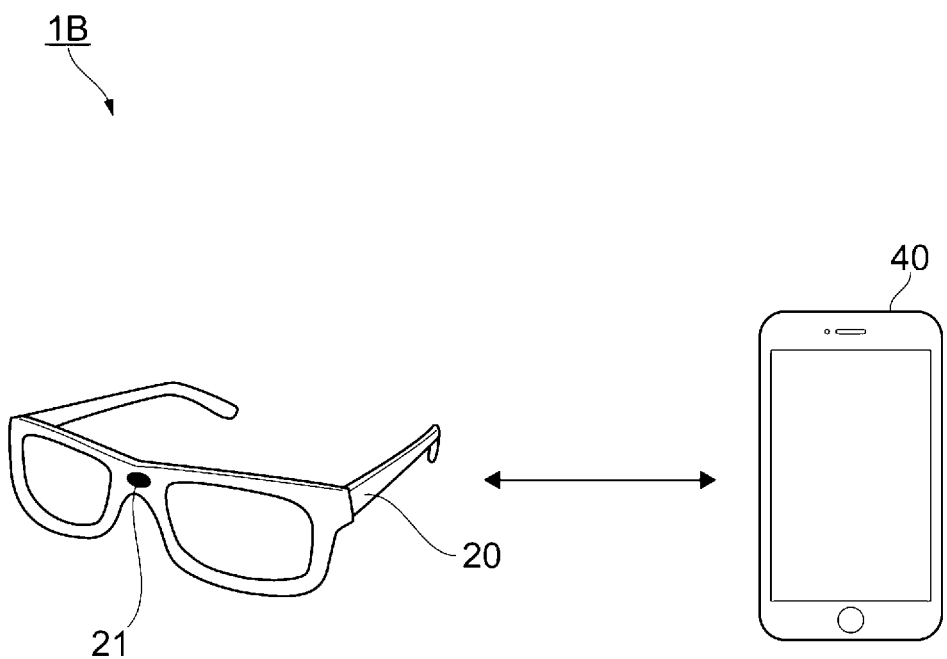
FIG. 31 is a diagram illustrating a usage example of an information processing system used in an eighth exemplary embodiment.

FIG. 31 is a diagram illustrating a usage example of an information processing system 1B used in an eighth exemplary embodiment. In FIG. 31, portions corresponding to those in FIG. 1 are denoted by the corresponding reference numerals.

In the information processing system 1B illustrated in FIG. 31, the function provided in the server 10 (see FIG. 1) is mounted on a portable terminal 40 that cooperates with the xR device 20.

In the case of FIG. 31, a smartphone is exemplified as the terminal 40. The terminal 40 has the hardware configuration illustrated in FIG. 29. The processor 201 of the terminal 40 is provided at least with the image analyzer 101A, the inquiry controller 101B, the output controller 101C, and the character recognition unit 201A. Further, the image data 111, the inquiry target table 112, and the provision timing table 113 are stored in the flash memory 204.

In the example of FIG. 31, a smartphone is exemplified as the terminal 40, but the terminal 40 may be a wearable terminal such as a watch type or a bracelet type, or may be a laptop computer or a tablet computer.

The terminal 40 is an example of an information processing apparatus.

Ninth Exemplary Embodiment

In a ninth exemplary embodiment, a case where information is provided by using position information on the xR device 20 will be described.

In the present exemplary embodiment, when there is information associated with position information measured by the positioning sensor 260 (see FIG. 5) of the xR device 20, an inquiry to a user is executed. Therefore, the xR device 20 used in the present exemplary embodiment does not require the camera 21 (see FIG. 1).

Figure 32:
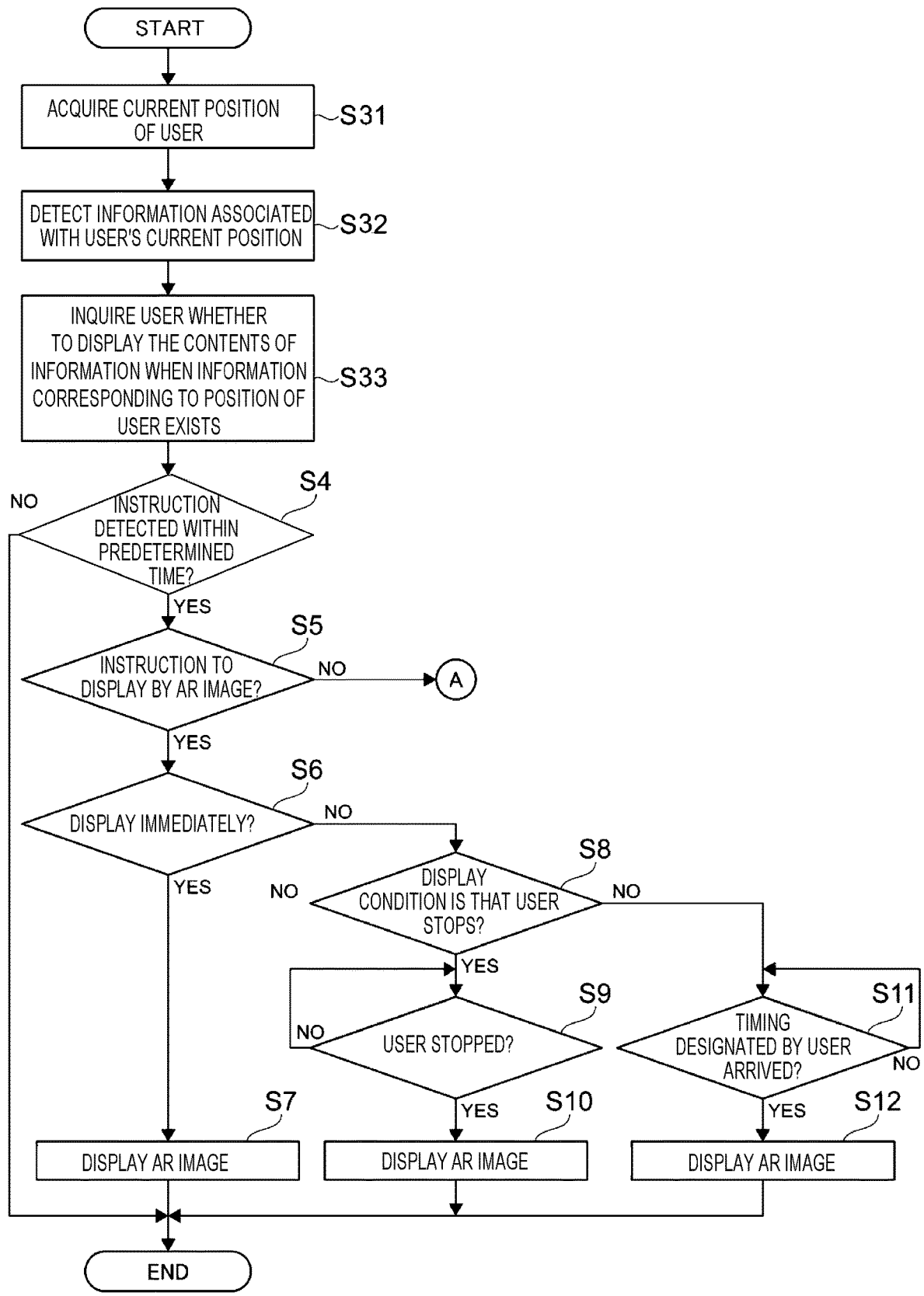
FIG. 32 is a flowchart of a portion of the processing operation according to a ninth exemplary embodiment.

FIG. 32 is a flowchart of a portion of the processing operation according to the ninth exemplary embodiment. In FIG. 32, portions corresponding to those in FIG. 7 are denoted by the corresponding reference numerals.

The processing operation illustrated in FIG. 32 is also executed by the server 10 (see FIG. 1).

The processor 101 (see FIG. 2) of the server 10 acquires the current position of a user (step 31). As described above, in the present exemplary embodiment, the position information determined by the positioning sensor 260 is uploaded to the server 10.

Next, the processor 101 detects information associated with the user's current position (step 32). The position information is stored in the hard disk drive 110 (see FIG. 2) in association with information such as stores, facilities, transportations, signboards, and advertisements registered in advance.

When information corresponding to the position of the user exists, the processor 101 inquires the user whether to display the contents of the information (step 33).

The subsequent processing operations are the same as the step 4 (see FIG. 7) and subsequent steps in the first exemplary embodiment. Further, when the negative result is obtained in step 5 (see FIG. 7), the step 21 (see FIG. 8) and subsequent steps are executed.

In the present exemplary embodiment, it is not necessary to capture the direction of the user's line of sight with the camera 21 (see FIG. 1). Therefore, the xR device 20 (see FIG. 1) does not require the camera 21.

Other Exemplary Embodiments (1) Although the exemplary embodiments of the present disclosure have been described above, the technical scope of the present disclosure is not limited to the scope described in the above-described exemplary embodiments. It is clear from the description of the claims that various modifications or improvements to the above-described exemplary embodiments are also included in the technical scope of the present disclosure.

(2) In the above-described exemplary embodiments, it is assumed that the camera 21 (see FIG. 1) captures the direction of the user's line of sight, but the range captured by the camera 21 may be the surroundings of the user. By capturing the surroundings of the user with the camera 21, it is possible to provide the contents of information existing in a place different from the direction of the user's line of sight, as an AR image or a voice.

(3) In the above-described exemplary embodiments, when the information included in the image obtained by capturing the surroundings of the user and the information associated with the user's position satisfy a predetermined condition, the user is inquired whether to display the information. However, the user may be inquired whether to display the contents of a received e-mail and alarm. A server that sends the e-mail and alarm here is an example of an external device. A notification such as the e-email or alarm occurs independently of the user's position and surrounding environments.

In addition, the external device includes a server that displays, for example, an automatic ticket gate, a digital signage arranged in a street, and characters of a game, as an AR image, on a user's terminal. The notification here is a notification of the contents of information associated with the user's position. A place where the automatic ticket gate is installed, a place where a terminal of the digital signage is installed, and a place where the characters of the game appear are examples of specific places.

(4) In the above-described first exemplary embodiment, the character recognition unit 201A (see FIG. 5) is provided in the xR device 20 (see FIG. 1), but it may be provided in the server 10 (see FIG. 1). Further, although the image analyzer 101A, the inquiry controller 101B, and the output controller 101C are all provided in the server 10, a part or all of them may be provided in the xR device 20. The same applies to other exemplary embodiments.

(5) In the above-described exemplary embodiments, the contents of information are output by the AR image or the voice, but the contents of information may be output by using both the AR image and the voice.

(6) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
when existence of predetermined information is detected, perform an inquiry to inquire a user whether to display contents of the information before the contents of the information are displayed as an augmented-reality image in front of a field of view of the user;
control displaying of the contents of the information by the augmented-reality image according to a user's instruction in response to the inquiry;
when instructed to display the contents of the information from the user within a predetermined time, detect a timing of outputting information to the user, and permit the displaying of the contents of the information at the detected timing; and
when there has been no instruction from the user within the predetermined time, not permit displaying of the augmented-reality image corresponding to the contents of the information.

2. The information processing apparatus according to claim 1, wherein
the processor is configured to use a method other than vision, for the inquiry.

3. The information processing apparatus according to claim 2, wherein
the processor is configured to use a sound for the inquiry.

4. The information processing apparatus according to claim 2, wherein
the processor is configured to use a vibration for the inquiry.

5. The information processing apparatus according to claim 1, wherein
the processor is configured to use a second augmented-reality image indicating that the information has been detected, for the inquiry.

6. The information processing apparatus according to claim 5, wherein
the processor is configured to display a mark as the second augmented-reality image.

7. The information processing apparatus according to claim 6, wherein
the processor is configured to select the mark according to the contents of the detected information.

8. The information processing apparatus according to claim 1, wherein the processor is configured to, when instructed to not display the contents of the information from the user, not permit the displaying of the contents of the information.

9. The information processing apparatus according to claim 1, wherein
the processor is configured to, when instructed to output the contents of the information by voice from the user, output the contents of the information by the voice.

10. The information processing apparatus according to claim 1, wherein
the processor is configured to detect an instruction of the user based on an image obtained by capturing a gesture of the user.

11. The information processing apparatus according to claim 10, wherein
the processor is configured to detect the user's instruction based on an image obtained by capturing a hand of the user.

12. The information processing apparatus according to claim 1, wherein
the processor is configured to, when receiving a condition for displaying the contents of the information in association with the instruction, permit the displaying of the augmented-reality image corresponding to the contents of the information at a point of time when the condition is satisfied.

13. The information processing apparatus according to claim 12, wherein
the processor is configured to receive the condition from the user each time the instruction is given.

14. The information processing apparatus according to claim 12, wherein
the processor is configured to, when the condition has been preset by the user, apply the condition to the displaying of the augmented-reality image corresponding to the contents of the information.

15. The information processing apparatus according to claim 1, wherein
the processor is configured to, when the contents of the information are included in an image obtained by capturing surroundings of the user, inquire the user whether to display the contents of the information.

16. The information processing apparatus according to claim 15, wherein
a device configured to display the augmented-reality image in the front of the field of view of the user comprises an imaging unit configured to capture an image in the front of the field of view of the user who wears the device, and
the information is detected from the image captured by the imaging unit.

17. The information processing apparatus according to claim 16, wherein a range captured by the imaging unit is set to be wider than the field of view of the user.

18. The information processing apparatus according to claim 1, wherein
the processor is configured to, when detecting a reception of the information from a first external device, inquire the user whether to display the contents of the information.

19. The information processing apparatus according to claim 18, wherein
when the user passes through a specific place, the information is given from a second external device at a place through which the user has passed.

20. An information processing method comprising:
when existence of predetermined information is detected, performing an inquiry to inquire a user whether to display contents of the information before the contents of the information are displayed as an augmented-reality image in front of a field of view of the user;
controlling displaying of the contents of the information by the augmented-reality image according to a user's instruction in response to the inquiry;
when instructed to display the contents of the information from the user within a predetermined time, detecting a timing of outputting information to the user, and permitting the displaying of the contents of the information at the detected timing; and
when there has been no instruction from the user within the predetermined time, not permitting displaying of the augmented-reality image corresponding to the contents of the information.

21. A non-transitory computer readable medium storing a program that causes a computer to execute information processing, the information processing comprising:
when existence of predetermined information is detected, performing an inquiry to inquire a user whether to display contents of the information before the contents of the information are displayed as an augmented-reality image in front of a field of view of the user;
controlling displaying of the contents of the information by the augmented-reality image according to a user's instruction in response to the inquiry;
when instructed to display the contents of the information from the user within a predetermined time, detecting a timing of outputting information to the user, and permitting the displaying of the contents of the information at the detected timing; and
when there has been no instruction from the user within the predetermined time, not permitting displaying of the augmented-reality image corresponding to the contents of the information.

* * * * *